United States Patent
Kaminaga et al.

(10) Patent No.: US 7,454,017 B2
(45) Date of Patent: Nov. 18, 2008

(54) INFORMATION PROCESSING UNIT

(75) Inventors: Masahiro Kaminaga, Sendai (JP); Takashi Watanabe, Tokyo (JP); Takashi Endo, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 663 days.

(21) Appl. No.: 10/990,977

(22) Filed: Nov. 18, 2004

(65) Prior Publication Data

US 2005/0108498 A1 May 19, 2005

(30) Foreign Application Priority Data

Nov. 18, 2003 (JP) ............................. 2003-387524
Feb. 4, 2004 (JP) ............................. 2004-027550

(51) Int. Cl.
*H04L 9/00* (2006.01)
(52) U.S. Cl. ......................................... 380/46; 713/174
(58) Field of Classification Search .................. 380/44, 380/46; 713/174; 708/250, 490, 492, 501, 708/530
See application file for complete search history.

(56) References Cited

U.S. PATENT DOCUMENTS

| 5,455,934 | A | * | 10/1995 | Holland et al. .................. 711/4 |
| 5,818,934 | A | | 10/1998 | Cuccia |
| 5,832,088 | A | * | 11/1998 | Nakajima et al. ............. 380/22 |
| 6,691,921 | B2 | | 2/2004 | Endo |
| 6,912,557 | B1 | * | 6/2005 | North et al. .................. 708/490 |
| 2003/0091191 | A1 | | 5/2003 | Watanabe et al. |

FOREIGN PATENT DOCUMENTS

| EP | 1073021 A2 | 1/2001 |
| JP | 2000-507072 A | 6/2000 |
| JP | 2001-5731 A | 1/2001 |
| JP | 2003-134103 | 5/2003 |
| JP | 2003-152702 | 5/2003 |

OTHER PUBLICATIONS

"Differential Power Analysis" Kocher, et al. pp. 388-397, 1999.
W. Rankl & W. Effing, "Smart Card Handbook (second edition)" John Wiley & Sons, p. 422, 2000.
Dan Boneh t al., "On the Importance of Checking Cryptographic Protocols for Faults"1998.
Eli Biham, et al, "Differential Fault Analysis of Secret Key Cryptosystems", Spinger-Verlag, pp. 514-525, 1998.
Alfred Menezes et al., "Handbook of Applied Crytography", Computer Applied Mathematics Engineering, CRC Press LLC, p. 516, 1997.

* cited by examiner

*Primary Examiner*—Hosuk Song
(74) *Attorney, Agent, or Firm*—Antonelli, Terry, Stout & Kraus, LLP.

(57) ABSTRACT

An object of the present invention is to a provide tamper resistant information processing unit that is used as an IC card with a high level of security.

To achieve the above-mentioned object, the information unit of the present invention comprises: a program container part for storing a program; a memory for storing data; an arithmetic unit for performing specified processing according to the program; a data bus for connecting the memory to the arithmetic unit; and a transform function for transforming a logical address and a physical address of the memory, said logical address being used for arithmetic operation by the arithmetic unit, said physical address being set at random corresponding to the logical address at each arithmetic operation or every time the information processing unit is started up.

26 Claims, 22 Drawing Sheets

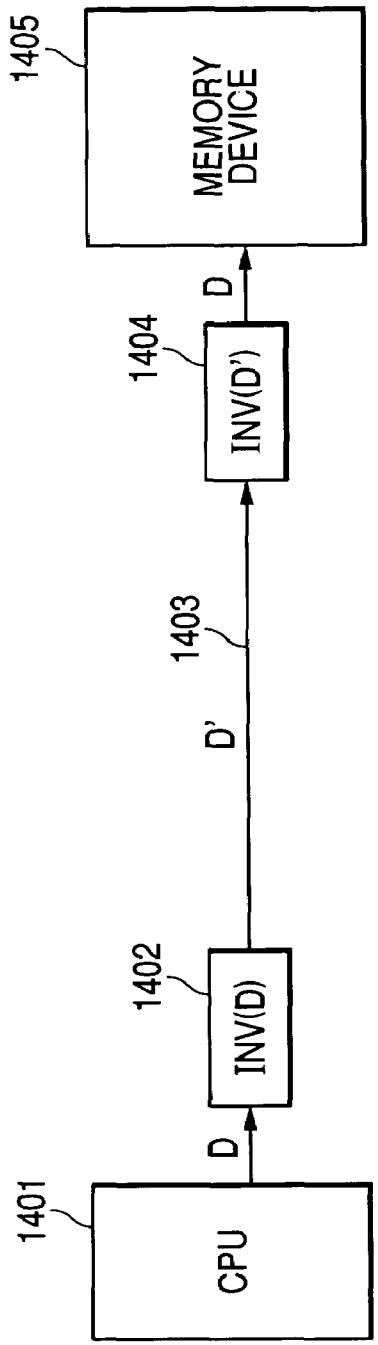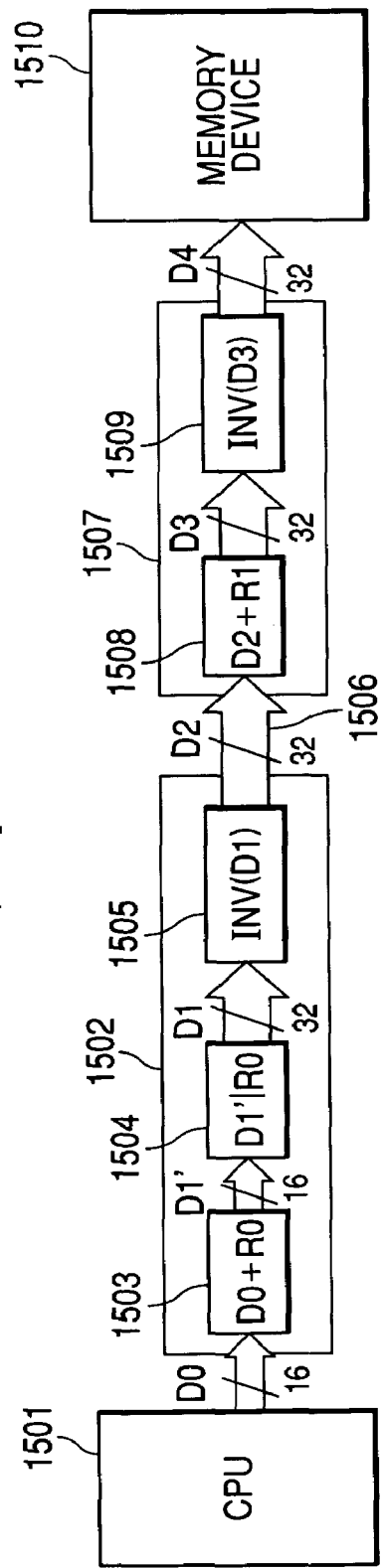

INFORMATION PROCESSING UNIT

CLAIM OF PRIORITY

The present application claims priority from Japanese application JP 2003-387524, filed on Nov. 18, 2003, and JP 2004-027550 filed on Feb. 4, 2004, the content of which is hereby incorporated by reference into this application.

BACKGROUND OF THE INVENTION

1. Field of the Invention

The present invention relates to a tamper resistant information processing unit with a high level of security, and more particularly to a technique that is extremely effective if the technique is applied to IC cards, and the like.

The present invention relates to a tamper resistant information processing unit capable of preventing processing information from being read and analyzed by power analysis or hardware probing in the information processing unit. Further, the present invention relates to a fault-detectable tamper resistant information processing unit that can detect a change in data and falsification of data caused by an attack at the time of writing/reading the data, or to a fault-tolerant tamper resistant information processing unit that can automatically recover data from the change or the falsification. In particular, the present invention relates to an information processing unit integrated into one chip, which is typified by IC cards (smart cards), in which the above functions are required.

2. Description of the Related Art

The IC card is a device that holds private information which must not be rewritten without permission, and that encrypts data by use of an encryption key, which is secret information, and decrypts encrypted data. The IC card itself is not equipped with the power supply. If a contact-type IC card is inserted into a reader/writer used for IC cards, the power is supplied to the contact-type IC card so that it becomes operable. A contactless-type IC card becomes operable by receiving a radio wave generated by a reader/writer so that the electric power is generated by use of the principles of electromagnetic induction. When the IC card becomes operable, the IC card receives a command transmitted from the reader/writer, and then performs processing, such as data transmission, according to the command. The contact-type and contactless-type IC cards are in principle the same because their main bodies are the same IC chips. Therefore, hereinafter only the contact-type IC card will be described.

As shown in FIG. 1, the basic concept of an IC card is that an IC card chip 102 is mounted on a card 101. In general, as shown in the figure, an IC card has at specified positions a supply voltage terminal Vcc, a ground terminal GND, a reset terminal RST, an input/output terminal I/O, and a clock terminal CLK. The positions of these terminals are specified in the standard of ISO 7816. Through these terminals, the power is supplied from the reader/writer, and data communication with the reader/writer is performed.

A semiconductor chip mounted on the IC card is basically configured in the same manner as ordinary microcomputers. FIG. 2 is a block diagram illustrating a basic configuration of a semiconductor chip mounted on an IC card. As shown in FIG. 2, the semiconductor chip used for a card member comprises a central processing unit (CPU) 201, a memory device 204, an input-output (I/O) port 207, and a coprocessor 202. Here, the memory device 204 has a PA (program area) and a DA (data area).

Incidentally, depending on a kind of system, there is also a system in which a coprocessor is not included. The CPU 201 is a device that performs logical operation, arithmetic operation, and the like. The memory device 204 is a device for storing a program and data. The input-output port is a device used to communicate with a reader/writer. The coprocessor is a device that performs, at high speed, encryption itself or arithmetic operation required for the encryption. For example, there are a special arithmetic unit for performing modular calculation of RSA cryptography, a device for performing processing of DES cryptography, and the like. Some processors for IC cards do not include a coprocessor. The data bus 203 is a bus for connecting devices to one another.

The memory device 204 comprises a ROM (Read Only Memory), a RAM (Random Access Memory), and an EEPROM (Electric Erasable Programmable Read Only Memory). The ROM is a memory, stored information of which cannot be changed. The ROM is a memory that mainly stores a program. The RAM is a memory, stored contents of which can be freely rewritten. However, if the power supply is interrupted, the stored contents are lost. The EEPROM is a memory that can hold its contents even if the power supply is interrupted. The EEPROM is used to store information that needs to be rewritten, and to store data that can be held even if the IC card is taken out from the reader/writer. For example, the amount of money spent by a prepaid card is held in the EEPROM.

In an information processing unit such as a microcomputer, typified by the IC card described above, information to be kept secret is held so that not only attackers who try to illegally access the information processing unit but also authorized users cannot perform read and write freely. Therefore, by use of an encryption key that is secret information, data to be kept secret may be encrypted and decrypted.

However, there is a possibility that information processed in the information processing unit inside will be predicted by observing the electric current consumption, and a radiated electromagnetic wave, of the information processing unit.

As measures against the above, there is a method in which a stored location of data is first changed, and next the data is encrypted/decrypted before the data is stored; and there is also a method in which a stored location of data is interchanged so that it is not possible to predict a stored location after the interchange from the stored location before the interchange (for example, refer to Japanese Patent Application Laid-Open No. 2003-134103).

The "attacker" on a certain system and a certain device means a person who, using a method that is not expected by a designer, analyzes the system and the device and thereby carries out an attack on them to extract information that is not disclosed to the outside in the first place. In a microcomputer chip with a high level of security, typified by IC cards, information to be kept secret is held so that not only attackers who try to illegally access the information processing unit but also authorized users cannot perform read and write freely. Therefore, by use of an encryption key that is secret information, data to be kept secret may be encrypted and decrypted (for example, refers to Japanese Patent Application Laid-Open No. 2003-134103).

Incidentally, Japanese Patent Application Laid-Open No. 2000-507072 discloses the technique in which between a digital receiver (for example, a decoder of a MPEG-2 digital television receiver) and a system decoder, the bit order of a cryptogram bit stream constituted of N bits from an N parallel bit line of a first data bus is scrambled to generate a scrambled cryptogram bit stream having a width of N bits, and then the bit order of the scrambled N-bit cryptogram bit stream is descrambled to generate a descrambled cryptogram bit stream that is the same as the original cryptogram bit stream.

As shown in FIG. 10, the microcomputer is basically configured to comprise: a central processing unit 1001; a memory device 1004; an input-output port 1007 for exchanging information with each part; and a signal line 1003 for connecting them to one another. The central processing unit 1001 is a device that performs logical operation, arithmetic operation, and the like. The memory device 1004 is a device for storing a program and data. The memory device 1004 is configured to include a ROM (Read Only Memory), a RAM (Random Access Memory), an EEPROM (Electric Erasable Programmable Read Only Memory), and a FRAM (Ferromagnetic Random Access Memory). The ROM is a memory, contents of which are fixed and therefore cannot be changed. The ROM is a memory that mainly stores a program. The RAM is a memory, stored contents of which can be freely rewritten. However, if the power supply is interrupted, the stored contents are lost. To be more specific, when the power supply to the device is interrupted, it becomes impossible to hold the contents of the RAM. The EEPROM and the FRAM are memories that can hold contents thereof even if the power supply is interrupted.

For example, an example of a computer main body used for the contact-type smart card is shown in FIG. 2. FIG. 2 is a diagram illustrating how terminals are placed when a chip of this semiconductor device is mounted on a plastic card. The computer main body in question is a packaged IC chip 1102, which is called COT. The IC chip 1102 is placed at a position next to the center of the card. FIG. 11 illustrates an example of how terminals are placed. To be more specific, the IC card has terminals of: Vcc (power supply); GND (ground); RST (reset); I/O (input/output); and CLK (clock). Supplying these signals from outside, for example, from a terminal unit, causes the chip to operate. As the terminal unit itself, basically a terminal unit of a general card system can be used.

As a method for attacking a microcomputer, typified by IC cards, the Differential Power Analysis (DPA) is known. The DPA is described in "Smart Card Handbook Second Edition" by W. Rankl, W. Effing (John Wiley & sons, LTD.) P. 422. The DPA is the analysis of power consumption at the time of encryption processing by a microcomputer. The DPA is an attack identifying a secret key that has been used for the encryption processing. The power consumption can be measured by placing a resistance between Vcc and GND shown in FIG. 2 to observe a voltage across the both ends. As for the method for measuring the power consumption, an example is also described in "Smart Card Handbook Second Edition" by W. Rankl, W. Effing (John Wiley & sons, LTD.) P. 422.

As a technique for protecting against the attack that is made by means of the power analysis, Japanese Patent Application Laid-Open No. 2001-5731 discloses the method in which data is encrypted between both information processing units before transmitting/receiving the data. The use of this method makes it possible to decrease or eliminate the correlation between the power consumption and transmitted data when the data is transmitted. As a result, the attack made by means of the power analysis becomes remarkably difficult.

In addition, as a method for changing data so that the electric current consumption cannot be predicted even if a value of the data is the same, Japanese Patent Application Laid-open No. 2003-152702 discloses the technique by which the relevance of a true value of data to its electric expression cannot be predicted as a result of encrypting data and then changing an encryption key in a short period of time.

In the meantime, there is known an attack that extracts a secret encryption key by changing processing data on purpose using a method for making a physical change, such as a FIB process. For example, an attack which extracts a secret encryption key by changing processing data during RSA cryptography processing is published as D. Boneh, R. A. Demillo, R. J. Lipton, "On the Importance of Checking Cryptographic Protocols for Faults", Proc. of EUROCRYPT '97, pp. 37-51, Springer-Verlag, 1997; and an attack on the DES cryptography is published as E. Biham, A. Shamir, "Differential Fault Analysis of Secret Key Cryptosystems", Proc. of Crypto '97, pp. 513-525, Springer-Verlag, 1997. As general measures, there is known a method in which the same processing is performed twice or more, and if the results agree with each other, it is determined that the result of the processing is correct.

According to the present invention, it is possible to provide a tamper resistant information processing unit with a high level of security such as card members.

A technical object of the present invention is to reduce the relevance between data processing in an IC card chip (for example, a card member) and the electric current consumption. If the relevance between the electric current consumption and processing of a chip is reduced, it becomes difficult to predict the processing in the IC card chip and an encryption key thereof from an observed waveform of the electric current consumption.

To be more specific, an object of the present invention is to provide a card member, or the like, with a high level of security.

Because a program and important information are concealed in a chip used for an IC card, the IC card is used to store the important information, and to perform encryption inside the card. Heretofore, the difficulty in decrypting the cryptography of an IC card was thought to be the same as that in decrypting the encryption algorithm thereof. However, what is suggested is a possibility that observing and analyzing the electric current consumption while the IC card performs the encryption will make it possible to predict contents of encryption and an encryption key more easily than decryption of the encryption algorithm. The electric current consumption can be observed by measuring an electric current supplied from a reader/writer. The reason will be described as follows.

A CMOS forming an IC card chip consumes an electric current when an output state changes from 1 to 0 or from 0 to 1. In particular, when a value of the bus changes from 1 to 0 or 0 to 1, a large amount of electric current flows through the data bus 203 because of an electric current of a bus driver, wiring, the electrostatic capacity of a transistor connected to the wiring. Therefore, there is a possibility that by observing the electric current consumption, an attacker will be able to know what is operating in the IC card chip.

FIG. 3 is a graph illustrating a one-cycle waveform of the electric current consumption by an IC card chip. Depending on data being processed, there is a difference in electric current waveform as shown by reference numerals 301 and 302. Such a difference arises depending on data flowing through the bus 203 and data processed by the central processing unit 201.

The coprocessor 202 can perform, for example, 512-bit modular calculation in parallel with the CPU. Accordingly, it is possible to make a long-time observation of a waveform of the electric current consumption thereof, which differs from the electric current consumption of the CPU. Observing a characteristic waveform of the coprocessor makes it possible to easily measure the number of times the coprocessor operates. If the number of times the coprocessor operates has some kind of relationship with an encryption key, there is a possibility that the encryption key can be predicted from the number of times. In addition, if there is a bias which is dependent on an encryption key, in the result of arithmetic operation by the coprocessor, there is a possibility that the bias will be determined by the electric current consumption, and thereby the encryption key will be predicted.

A typical example of the power consumption dependent on data is the electric power used in an address bus. Because the address bus must always operate, the operation is controlled by a static method. In the static method, without clearing data every time, the electric power is consumed by the amount equivalent to the change between the last value and a current value. Accordingly, for example, if an address (program counter) changes at every 2 bits as 800C→800E→8010→8012→8014→8016→8018, the electric power consumed is substantially in proportion to:

The number of bits changed at the time of 800C→800E is equivalent to 1;

The number of bits changed at the time of 800E→8010 is equivalent to 4;

The number of bits changed at the time of 8010→8012 is equivalent to 1;

The number of bits changed at the time of 8012→8014 is equivalent to 2;

The number of bits changed at the time of 8014→8016 is equivalent to 1; and

The number of bits changed at the time of 8016→8018 is equivalent to 3.

Here, the values of the addresses are expressed in hexadecimal numbers (hereinafter, addresses are expressed in hexadecimal numbers unless otherwise specified). Because how the power is consumed depends on a binary value, expressing in binary numbers enables easier understanding of the power consumption. Because the higher 8 bits do not change, the change in the lower 8 bits of the above-mentioned addresses is shown as follows.

00001100→100001110→100010000→100010010→00010100→00010110→00011000

If exclusive OR operation is performed between two consecutive values, the change in values is obtained as follows.

00000010→00011110→00000010→00000110→00000010→00001110

It can be easily understood that these hamming weights correspond to the changed number of bits described above.

If this characteristic is made use of, it is possible to illegally extract internal information by checking the change in power consumption without opening the IC chip. In particular, the Differential Power Analysis (DPA), which is an attack performing statistical processing for a large amount of data to extract an encryption key, is effective even if an attacker does not have the knowledge about a method for implementing a cryptography program at all.

As an effective method for solving this problem, there is considered a method in which data is located so that the hamming distance becomes equal. However, in general, as far as small-size devices such as IC cards are concerned, the size of a RAM is severely limited. If the number of data is large, or if data is large, it is difficult to locate the data in a manner that the hamming distance becomes completely equal.

An object of the present invention is to make a power analysis attack difficult, and at the same time, to make direct data reading by hardware probing difficult, and further to detect or correct an error occurring at the time of data transmission through a data bus. More specifically, the object of the present invention is to provide an information processing unit with a high level of security. As a representative example of the information processing unit in question, a computer system (in particular, a microcomputer system) can be named. Moreover, the present invention provides a card member and a card system with a high level of security, typified by IC cards (smart cards).

A more technical object of the present invention is to reduce the relevance between data processing in a microcomputer chip and the power consumption thereof. Additionally, another object is to prevent data transmitted inside the chip from being directly read by probing and from being falsified. In particular, IC cards are used to store important information to be concealed, and also to perform encryption and authentication processing of data in the IC cards. The reason why the IC cards are used for the purposes requiring the high level of security is that a program and important information are concealed in an IC card chip, and that various kinds of measures for concealing information are taken so that it becomes difficult to illegally trace processing of secret data.

Heretofore, the difficulty in decrypting encryption processing in an IC card was thought to be the same as that in decrypting encryption algorithm itself. However, the attack method by which contents of encryption processing and an encryption key are predicted by analyzing the power consumption when an IC card performs encryption is considered to be easier than the method for directly decrypting the encryption algorithm.

This method, which is called power analysis and was proposed by P. Kocher, and others, is an attack that makes use of the relevance between a bit state of data processed by an IC card and the power consumption thereof. Accordingly, if the relevance between the power consumption and processing of the chip is reduced, it becomes difficult to predict processing in the IC card chip and an encryption key from the power consumption observed. A main point aimed at by the present invention is to reduce the relevance between the power consumption of a microcomputer and data being processed. Main means for achieving this object is to change the charge and the discharge of signal lines (for example, bus lines, bit lines in a RAM, and word lines), which are one of causes of the difference in power consumption, to a state different from that of original data.

SUMMARY OF THE INVENTION

To begin with, what will be described as below as a background of the present invention is a possibility that processing will be decrypted by observing the power consumption. If this possibility is understood, it is possible to easily understand the points of the present invention.

Main points of the above-mentioned power analysis will be described as follows. A gate circuit of a CMOS (Complementary Metal-Oxide Semiconductor) forming an IC card chip consumes the electric power when an output state changes from 1 to 0 or from 0 to 1. In particular, because a signal line has the large wire capacity, the gate circuit consumes the large electric power due to its charge and discharge when a data value of a bus changes from 1 to 0 or 0 to 1. If such power consumption is observed, there is a possibility that contents of date processing performed in the IC card chip will be decrypted.

FIG. 3 is a graph illustrating in time series a one-cycle waveform of the power consumption of an IC card chip. Depending on a value of data being processed, there is a difference in waveform of the electric power consumption as shown by the reference numerals 301 and 302. The difference in waveform between the above power consumptions arises depending on data flowing through a signal line, data being processed in a central processing unit, and the like.

At present, control methods for controlling a signal line of an IC card chip are roughly classified into two kinds. One is a static bus system; and the other is a precharge bus system. The static bus system is a method that does not clear data held in a bus. On the other hand, the precharge bus system is a control method in which with the object of clearing data every time processing is completed, all data of a signal line are set at 1 or 0 before the next data is inputted. Incidentally, which to set the signal value at 1 or 0 as the precharge depends on a kind of a logical circuit that is positive logic or negative logic. However, the principle of the operation is the same.

As clearly understood from the description of the above basic operation, the difference in control method causes waveforms of the power consumption to differ from each other. Judging from the difference in power consumption waveform, it is possible to identify which control method is being applied. If the control method for controlling a signal line is identified, it is possible to observe the influence of a bit value of the encryption key by changing data to be processed for a fixed encryption key to observe a change in power consumption in response to it. Moreover, a possibility of being able to predict an encryption key arises as a result of analyzing a waveform of the power consumption. Although information about a processing method, which is a target of the analysis, is required to determine a specific analysis method for analyzing the power consumption, it is possible to easily acquire information about an encryption system because encryption algorithm is opened to the public and is standardized, which are results of modern cryptography.

As described above, as a method for reducing the correlation between the power consumption and real data by encrypting bus data, there is the technique disclosed in Japanese Patent Application Laid-Open No. 2000-507072, which will be outlined as follows: (a) placing encryption and decryption devices at both ends of a bus line, and performing encryption on the transmission side and performing decryption on the receiving side by use of the same encryption key; (b) in a bus line connected to an information storage device, placing an encryption/decryption device on the data transmission side, and storing data, which has been encrypted on the transmission side, in the information storage device by use of the same encryption key: on the other hand, when reading out data from the information storage device, performing decryption by use of the previously used encryption key. (Although other methods are also disclosed, these methods will not be described here because they do not relate to the present invention).

It is certain that the correlation between the power consumption and real data can be reduced using this method. However, as for (a), because what is written to and read out from the information storage device is real data, the power consumption dependent on the real data being processed at that time is observed. In addition, data after performing the decryption can be directly read out by probing. As for (b), reading out data by probing the bus line makes it possible to know data stored in the information storage device. In this case, a large amount of data is transmitted at a time. Nevertheless, even if all data cannot be acquired, it is possible to successively acquire a series of data by using some data as a guide to read out information stored in the information storage device. The acquired data is encrypted. However, depending on a kind of implementation method of encryption, it is possible to acquire an encryption key only by determining the timing in which the same data is used. Moreover, because the encryption key needs to be shared between the transmission side and the receiving side, it is necessary to prepare a dedicated bus line therefor. Accordingly, attention should also be paid to the point that there is a possibility of being able to acquire the encryption key by probing the dedicated bus line.

While the measures against the power analysis are required, measures against data read by directly probing a bus line are also required. Data is transmitted and received between modules through the bus line inside an IC chip. It is possible to read transmitted data and received data by directly probing the data flowing through the bus line. The probing is a method that is generally used at the time of debugging and testing a LSI. Depending on a kind of implementation method of encryption, it is not necessary to read out all bus data at a time. Therefore, there is a case where observing only data being exchanged through part of wiring suffices. For example, as one of methods for implementing RSA cryptography, the binary method is known. In the binary method, if it is possible to successively distinguish a kind of data used in certain timing, between two kinds, an encryption key can be identified eventually. If the number of kinds to be determined is two, one bus line have only to be monitored at minimum. Therefore, it is necessary that even if only a part of wiring is observed, this does not make it possible to decrypt cryptography.

In addition, because data is electrically transmitted and received, there is a possibility that a part of or all of data will be changed on purpose, for example, by physically connecting wiring to GND by means of FIB processing. If an attacker carries out such an attack in encryption timing aimed at by the attacker on purpose, there is a possibility that an encryption key will be read as described in Japanese Patent Application Laid-Open No. 2001-5731, and Japanese Patent Application Laid-Open No. 2003-152702. Accordingly, it is necessary to ensure the integrity of data transmitted through wiring.

The present invention has an effect of making it difficult to predict a state inside a microcomputer by analyzing the power consumption, to read out data by probing a bus line, and to falsifying transmitted data. As a result, it is possible to improve the tolerance to an attack on encryption including the power analysis and the difference failure analysis.

Typical features of the present invention disclosed in this application concerned will be briefly outlined as below.

According to one aspect of the present invention, there is provided an information processing unit comprising: a memory; an arithmetic unit; and a transform function for transforming a logical address and a physical address of the memory, said logical address being used for arithmetic operation by the arithmetic unit, said physical address being determined from the logical address and a random number by arithmetic operation.

The above-mentioned configuration makes it possible to randomize the relationship between data and an address. As a result, the relevance between the electric current consumption and processing in the information processing unit decreases, and accordingly it becomes difficult to predict the processing in the information processing unit and an encryption key thereof.

According to another aspect of the present invention, there is provided an information processing unit comprising: an arithmetic unit; a memory device for storing data transmitted from the arithmetic unit; a data bus, the number of bits of which is (N+r), said data bus connecting the arithmetic unit to the memory device; a random number generator; and a data transform device, wherein: using, as a key, data formed of a random number having a length of r bits generated by the random number generator, said data transform device encrypts data having a length of N bits, which has been transmitted from the arithmetic unit, to generate encrypted data having a length of N bits, and then concatenates the encrypted data with the random number to generate data having a length of (N+r) bits before outputting the data having a length of (N+r) bits to the data bus.

The above configuration makes it possible to randomize internal data so as to protect against attacks including: predicting a state inside a microcomputer by analyzing the power consumption; reading out data by probing a bus line; and falsifying transmitted data. To achieve the above-mentioned objects, the present invention provides a data transform device, a configuration of a data bus, and a configuration of an information processing unit.

A main point of the present invention is that while a one-to-one correspondence between a physical address and an address specified by a program is kept unchanged, this correspondence is changed in appropriate timing. As a result, the determination of an address is free from continuity, and accordingly an enhanced effect of providing untraceability is produced. Therefore, it is possible to reduce the relevance between data processing and the electric current consumption in an information processing unit. If the relevance between the electric current consumption and processing of a chip is reduced, it becomes difficult to predict processing in the information processing unit and an encryption key thereof from an observed waveform of the electric current consumption.

To be more specific, according to the present invention, it is possible to provide a tamper resistant information processing unit with a high level of security such as an IC card.

The present invention has an effect of making it difficult to predict a state inside a microcomputer by analyzing the power consumption, to read out data by probing a bus line, and to falsifying transmitted data. As a result, it is possible to improve the tolerance to an attack on encryption including the power analysis and the difference failure analysis.

BRIEF DESCRIPTION OF THE DRAWINGS

FIG. 14 is a diagram illustrating how a device is configured if an inverse calculation function is used to transform the data D;

FIG. 15 is a diagram illustrating a configuration of a device that transforms data D while making an addition of key data;

PREFERRED DESCRIPTION OF THE EMBODIMENTS

Figure 1:
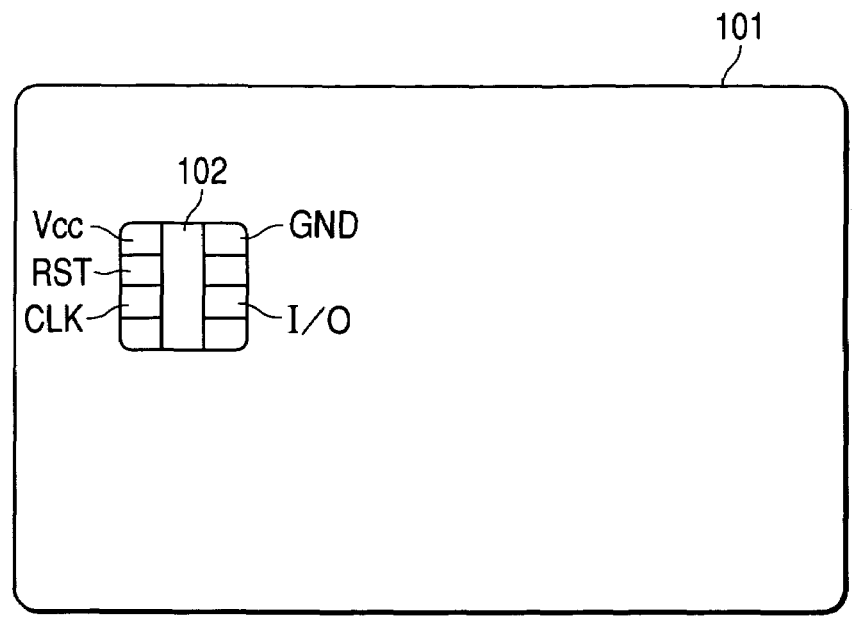
FIG. 1 is a plan view illustrating an outline of an IC card and an example of terminals.
Figure 2:
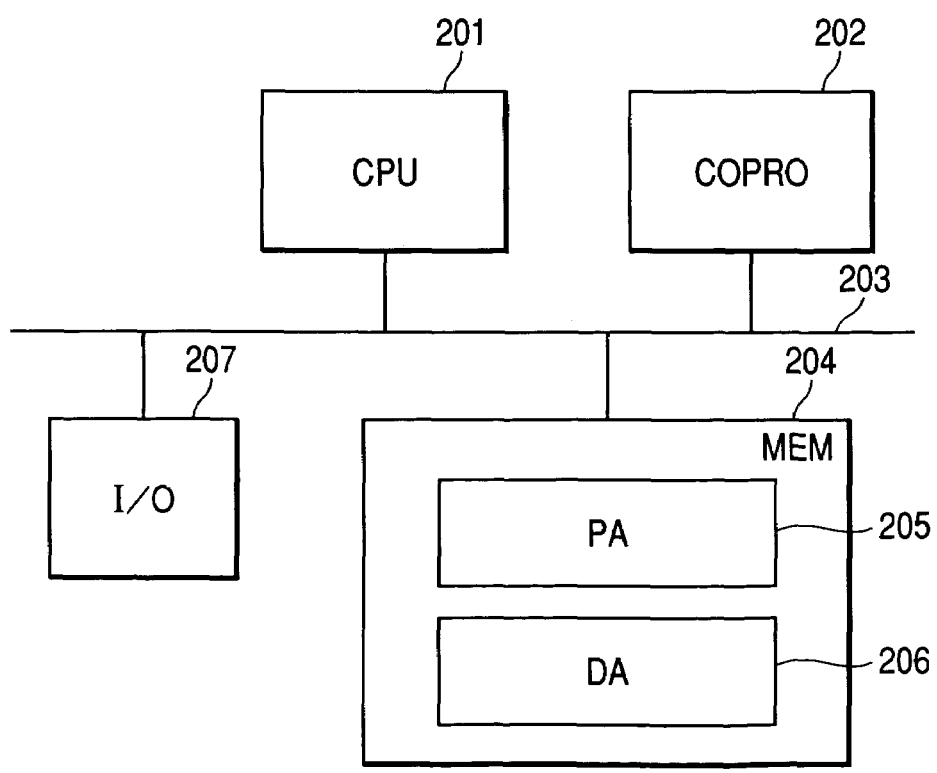
FIG. 2 is a block diagram illustrating a basic configuration of a microcomputer.
Figure 3:
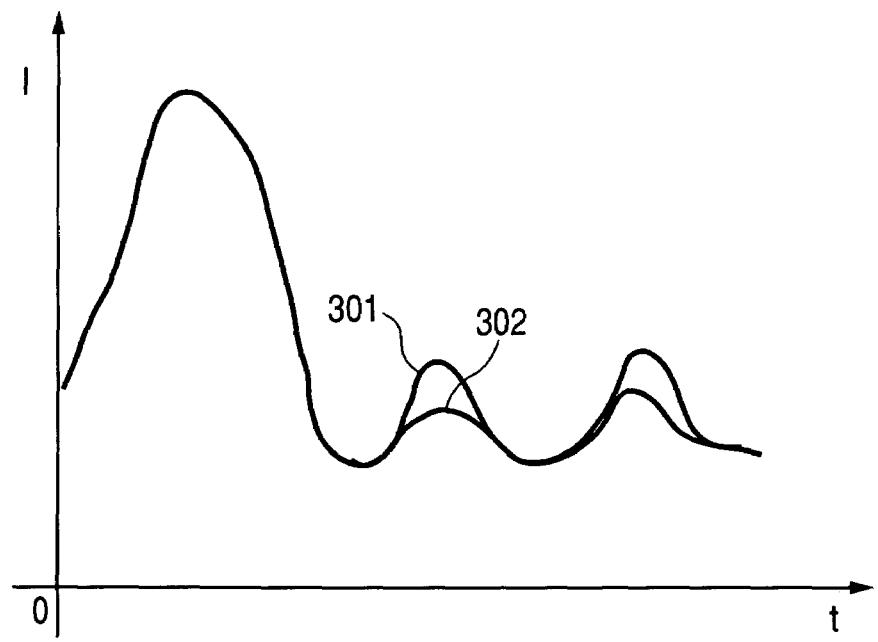
FIG. 3 is a diagram illustrating an example of a waveform of the electric current consumption in an IC card.

The essence of the present invention is that while a one-to-one correspondence between a physical address and an address specified by a program is kept unchanged, this correspondence is changed in appropriate timing. From the viewpoint of security, the complicated correspondence is more desirable. However, what is important is only that to protect against the statistical attack like the Differential Power Analysis (DPA) described above, a physical address is changed every time. For this reason, when embodying the present invention, an address mapping circuit is configured as simply as possible.

To solve the above-mentioned problems, according to the present invention, when executing processing that includes secret information, such as cryptography calculations, an address for locating data is physically changed every time the cryptography calculations or part of the cryptography calculations, is executed. There are the following determination methods for determining a location address: one is a method that cannot be predicted from outside, to be more specific, a method in which a location address is determined in an untraceable manner so that the location address looks like a randomly determined location address; and another is a method in which a location address is uniformly determined so that the difference cannot be distinguished from outside. Further, there is a method that uses both of the above methods in combination. All of the methods are technologies taken as measures based on an experimental fact that the power consumption involves the hamming weight, or the hamming distance, of processing data. Various kinds of modes can be considered as methods for achieving the technologies.

The most typical method will be described as below.

For an ADDR (USER), which is a data address specified by a program, a physical address ADDR (PHYS) is changed by use of a random number R (the R is integer) as follows: ADDR (PHYS)=ADDR (START)+(((ADDR (USER)−ADDR (START))+R) mod M) (equation 1). Here, ADDR (START) is a starting address of an address to be randomized; M is an appropriate natural number (the size of a RAM area to be randomized); and X mod M is a remainder obtained by dividing X by M. A dedicated arithmetic unit changes the physical address according to the (equation 1). Incidentally, most generally, the random number R is generated using a random number generator that is built into an IC card. However, pseudo-random number generation algorithm such as the linear congruential method can also be substituted for the use of the random number generator. As random number generators built into an IC card, there are a true random number generator that makes use of physical noises, a pseudo-random number generator that uses LFSR, and the like. In particular, although some pseudo-random number generators are implemented as hardware, they may also be implemented as software. The pseudo-random number generator, therefore, may also have a configuration in which a CPU generates a pseudo-random number to be used.

Because an original address is the ADDR (USER), the physical address determined by the (equation 1) differs from the ADDR (USER) unless R becomes a multiple of M. R may also be changed at each reset, or may also be changed every time the encryption processing is executed.

An example of numerical values with which a physical address is changed according to the (equation 1) will be described as below.

For example, 128 is taken for M. To begin with, R changes every time a program is executed. For example, if R changes to 50, 4, 120, 56 in sequence, an address ADDR (USER)=2000, which is specified by a user, changes to 2050, 2004, 2120, 2056 respectively at every execution. This makes it possible to protect against a statistical attack by DPA. For example, if data is referred to by table look-up like the SBOX processing in DES (DATA ENCRYPTION STANDARD: standard cryptography used in the U.S.A), the correspondence between data and an address is established. However, because the correspondence can be randomized by the above-mentioned method, it becomes difficult to extract a secret key.

The address may also be changed by a method other than the (equation 1). The essence of the present invention is that the ADDR (USER) is in a one-to-one correspondence with the ADDR (PHYS). Accordingly, the (equation 1) is merely an example.

Another embodiment of the present invention, which uses a method other than the method of the (equation 1), will be described as below. To be more specific, what is considered is a circuit that, for an access from a RAM address ADDR_L to ADDR_H (ADDR_L<ADDR_H) (in other words, ADDR_L<=ADDR (USER)<=ADDR_H), randomly selects either ADDR (PHYS)=ADDR_H−ADDR (USER) (equation 2) or ADDR (PHYS)=ADDR (USER) with a probability of ½. This method also makes the statistical attack such as DPA difficult.

As a matter of course, there are also other methods. On the assumption that the random number R has the same bit length as that of the address space, ADDR (PHYS)=ADDR (USER) XOR R (equation 3) is used, which is also an effective method. Here, XOR is exclusive OR on a bit basis. Judging from the (equation 3), the ADDR (USER) is obviously in a one-to-one correspondence with the ADDR (PHYS).

The above-mentioned methods are relatively easy to implement, and achieve a fine effect. However, it is needless to say that besides the above-mentioned methods, various kinds of address mapping methods can be considered.

Depending on the situation, using properly such measures, and a method in which the hamming distance between addresses is kept aligned, makes it possible to take flexible and effective measures.

Various embodiments according to the invention will be described in detail as below.

Figure 9:
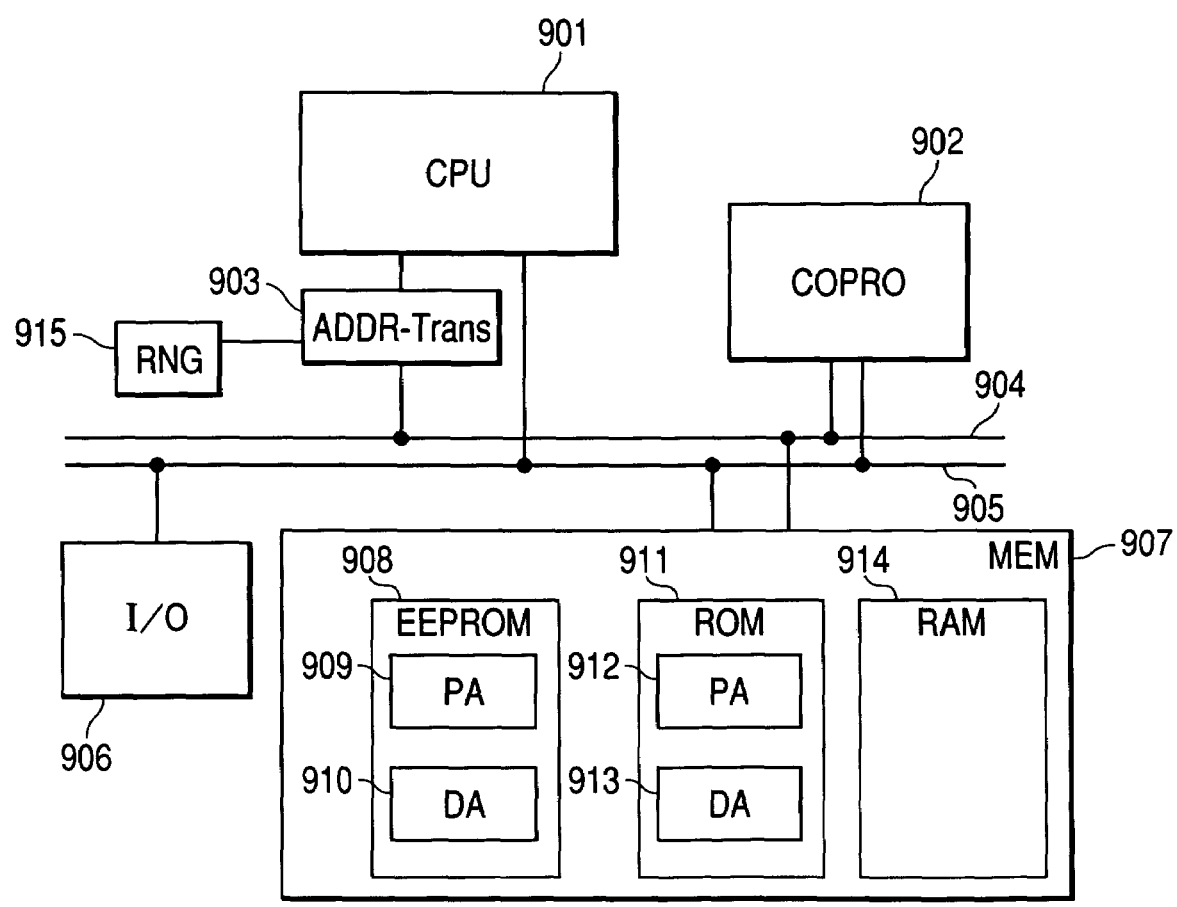
FIG. 9 is a diagram illustrating the total configuration of the present invention.
Figure 10:
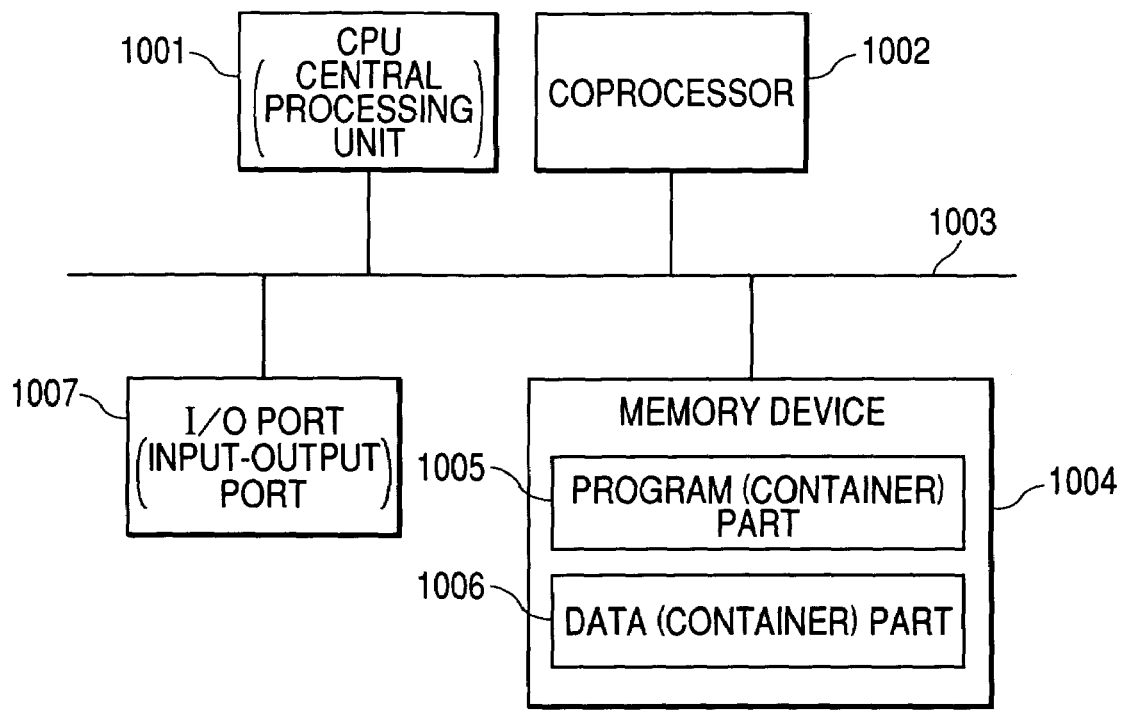
FIG. 10 is a configuration diagram illustrating a general microcomputer.
Figure 11:
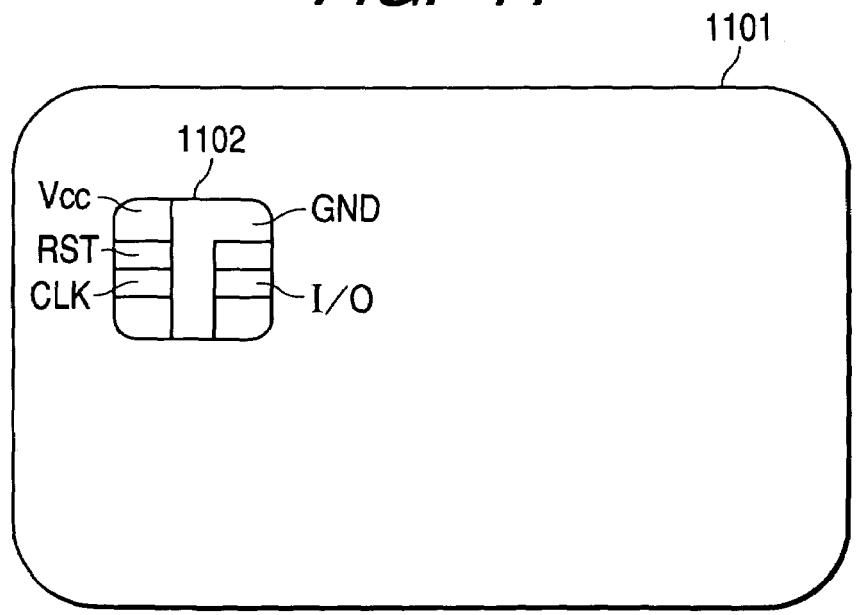
FIG. 11 is a diagram illustrating the outward appearance of a general IC card (smart card)
Figure 12:
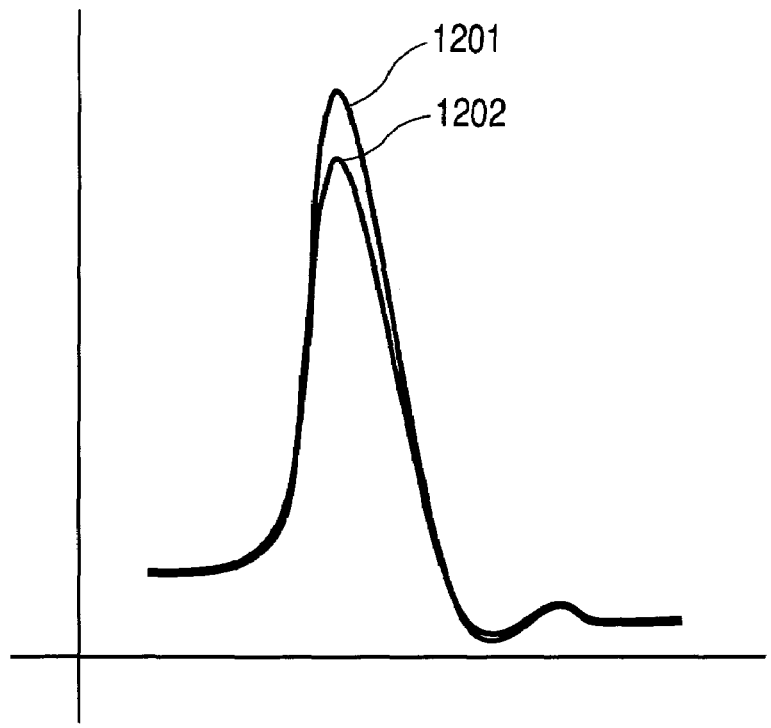
FIG. 12 is a graph illustrating two kinds of power consumption waveforms corresponding to two different kinds of processing in a microcomputer.

In the first place, FIG. 9 is a diagram illustrating a total configuration of the present invention. This configuration comprises a central processing unit (CPU) 901, a coprocessor 902, an address converter 903, an address bus 904, a data bus 905, an input/output (I/O) port 906, a memory unit 907, an EEPROM 908, a ROM 911, a RAM 914, and a random number generator 915. Incidentally, the EEPROM 908 includes a program area 909, and a data area 910, of the EEPROM, and the ROM 911 includes a ROM program area 912, and a ROM data area 913.

The CPU 201 is a device that performs logical operation, arithmetic operation, and the like. In the preferred embodiment, the CPU reads a program stored in a nonvolatile memory such as the EEPROM 908, and the ROM 911, and then executes specified processing according to the program.

The memory unit 906 is a device for storing a program and data. The input-output port is a device used to communicate with a reader/writer.

Figure 4:
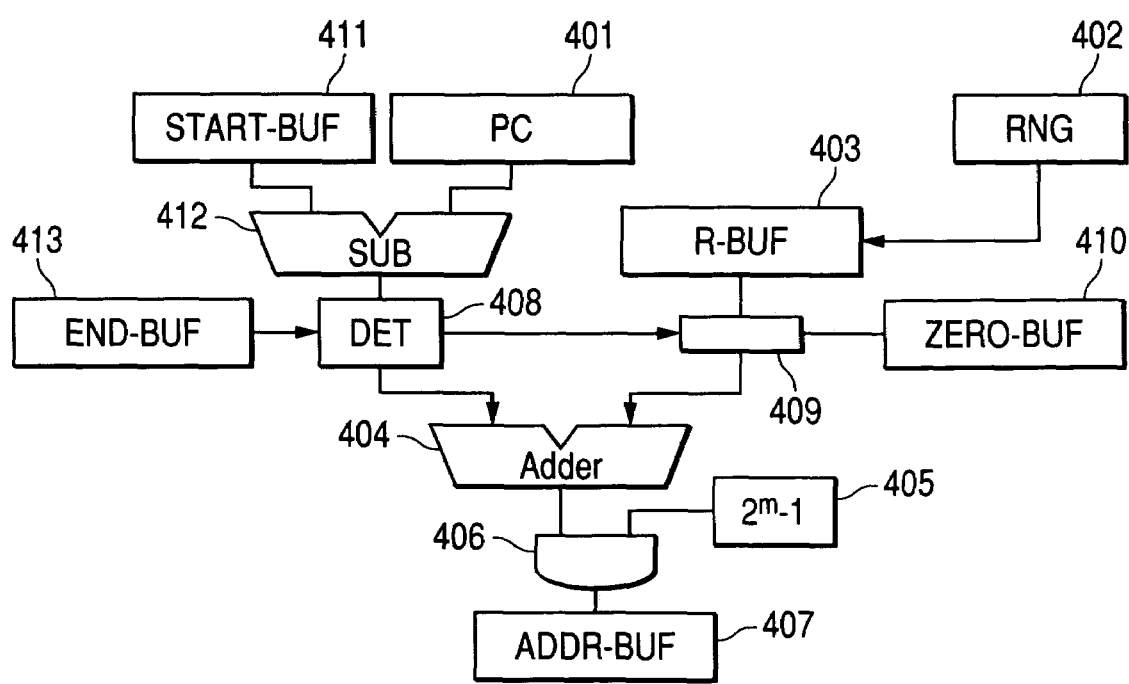
FIG. 4 is a diagram illustrating a first embodiment according to the present invention.
Figure 7:
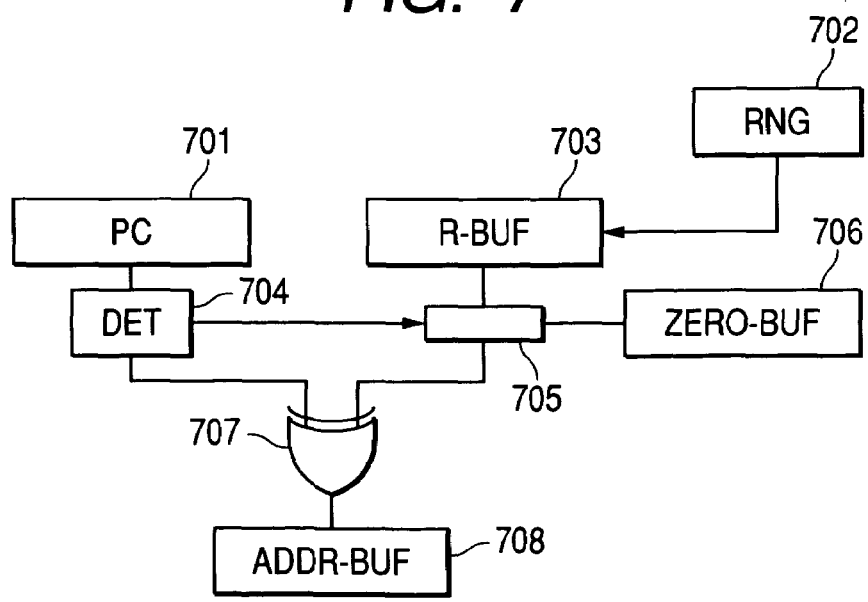
FIG. 7 is a diagram illustrating a second embodiment according to the present invention.

The address converter 903 which is placed between the CPU and the address bus 904 makes a determination as to whether or not an address value to be transmitted to the address bus 904 points to a location of the EEPROM, the ROM, the RAM, or the like. If a location pointed to by the address value is within a specified area of the RAM, the address converter 903 converts an address signal coming from the CPU by a mechanism as shown in FIGS. 4 and 7. Reference numeral 905 is a data bus, and accordingly is not converted.

A PC shown in FIG. 4 or 7 is usually placed inside the CPU. To be more specific, in FIG. 4, the address converter is a part excluding reference numerals 401 and 402; and in FIG. 7, the address converter is a part excluding reference numerals 701 and 702.

Incidentally, the CPU has a circuit that calculates PC+displacement (this corresponds to a jump address given by a jump instruction, or the like) so as to change a program counter. Accordingly, there is a case where even a subtracter (this is the same as an adder) is placed inside the CPU.

An ADDR-BUF is connected to the address bus 904, and is devised to output a converted address to the address bus. A driver used for data output is connected to the ADDR-BUF. The driver outputs data of the ADDR-BUF to the address bus. Because the conversion requires a random number, the random number generator 915 is connected to the address converter. This random number generator corresponds to reference numeral 402 in FIG. 4, and to reference numeral 702 in FIG. 7. The random number generator is also used when the CPU 901 and the coprocessor 902 generate an encryption key, or the like. Therefore, depending on a kind of information processing unit, there is a case where one shared random number generator is provided inside, or a case where a plurality of random number generators are provided inside. Complete commonality or partial commonality may also be achieved across these random number generators and the random number generator 915 connected to this address converter. Such a configuration makes it possible to suppress the increase in cost that is caused by the increase in area for hardware implementation or is caused by the increase in capacity required for program installation in the case of software implementation.

The coprocessor is a device that performs, at high speed, encryption itself or arithmetic operation required for the encryption. Depending on a kind of system, there is also a system in which a coprocessor is not included. Because in this embodiment a memory (RAM) of the CPU and a memory of the coprocessor are independent of each other, the address converter operates independent of the coprocessor. If a memory (RAM) is shared between the coprocessor and the CPU, it is also necessary to provide the coprocessor with an address converter. In this case, the random number R used for the address conversion should be the same as that used in the address converter of the CPU. Accordingly, for example, a buffer storing the random number R is shared.

First Embodiment

Figure 5:
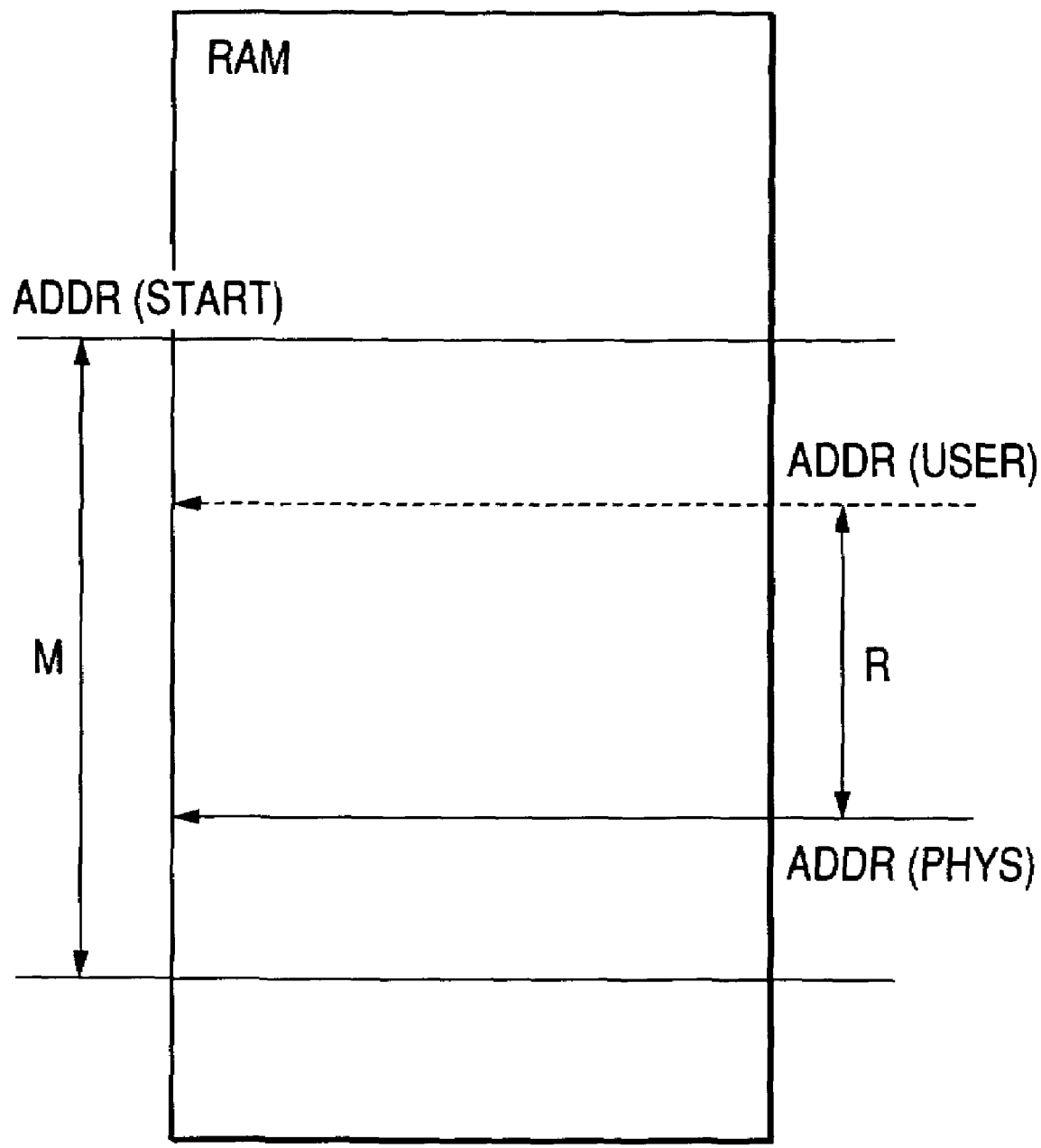
FIG. 5 is a diagram supplementing the description in FIG. 4.
Figure 6:
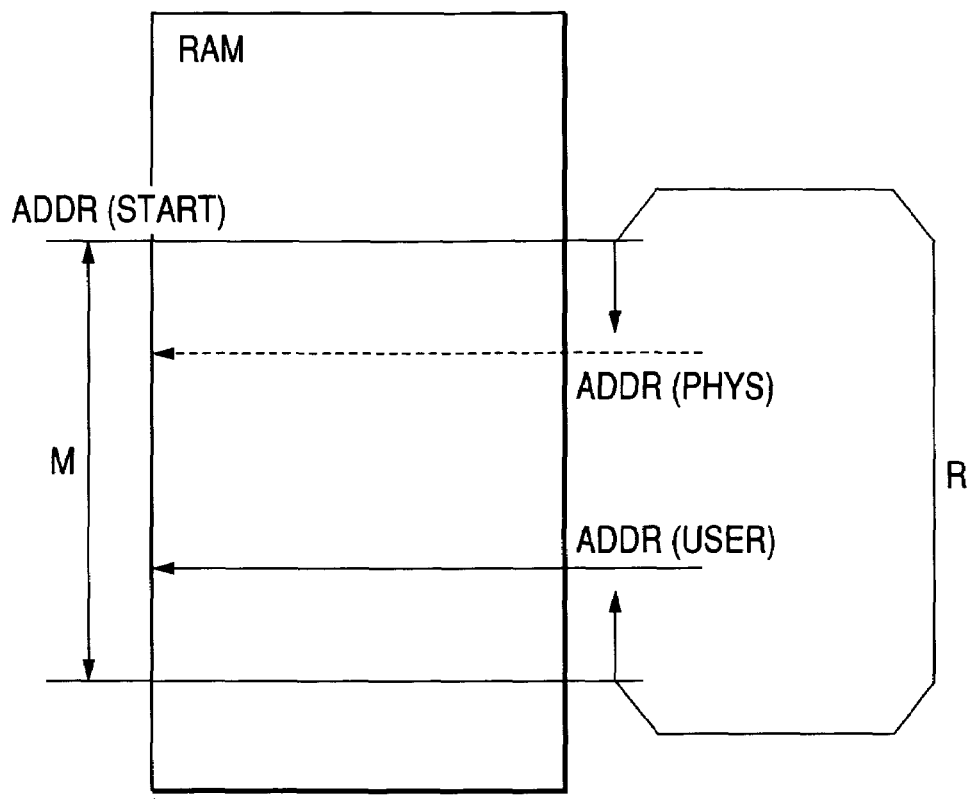
FIG. 6 is a diagram supplementing the description in FIG. 4.

To begin with, an embodiment in which a physical address is mapped according to the (equation 1), and the operation thereof, will be described with reference to FIGS. 4, 5 and 6.

First, the simplest embodiment in which $M=2^m$ (the m-th power of 2) will be described.

An embodiment of the present invention shown in FIG. 4 includes the undermentioned components. To be more specific, the embodiment includes: a program counter buffer 401; a random number generator 402; a random number buffer 403; an adder 404; a buffer (PC) 405 for storing $2^m-1=M-1$ (m pieces of 1 are lined up in binary notation); a circuit 406 for calculating AND (Logical AND); a physical address buffer 407; a determination circuit 408 for determining whether or not a location pointed to by a program counter is within a specified area; a selector 409; a zero buffer 410; a start address buffer 411; a subtracter 412; and an end address buffer 413. Here, a value 0 is stored in the zero buffer. Because this is a fixed value, it is not necessary to use a register as the zero buffer. However, a register is used here for the sake of simplification. The program counter is used to store an instruction to be executed, or a location of data, required when a microcomputer executes a program. The determination circuit 408 is a device by which if a location pointed to by a value of the program counter is within a specified area (more specifically, the location is within a range between an ADDR (START) and an ADDR (END)), 1 is transmitted to the selector 409, whereas if not, 0 is transmitted to the selector 409, and a value of the program counter is transmitted to the adder 404. In addition, the selector 409 is a device by which if an output signal of the determination circuit 408 is 1, a value of 403 is transmitted to the adder 404, whereas if an output signal of the determination circuit 408 is 0, a value of 410 is transmitted to the adder 404. These configurations will not be described in detail to avoid the complexity. However, having the basic knowledge about logical circuits makes it possible to easily achieve the configurations, and the feasibility of the invention will not be lost. It is to be noted that what is calculated in this embodiment is not the ADDR (PHYS) itself but a relative location from the ADDR (START). Depending on a kind of system, the ADDR (START) is added to the result of the ADDR-BUF to calculate the relative location. However, the detailed explanation thereof will be omitted here for the sake of simplification.

In FIG. 4, in the first place, the random number generator 402 generates a random number according to a control signal, and then stores its value in the R-BUF. Here, as the timing of newly storing in the R-BUF the random number R generated by the random number generator 402, there are two ways: (1) before newly starting processing which includes secret information after a reset is made; and (2) if data in a memory (an area to which a random offset is applied) is not made use of in processing thereafter, before newly starting processing which includes secret information after data in a memory is released.

A value of the R-BUF is fixed until a control signal newly arrives. The ADDR (USER) is temporarily stored in the PC. Then, the determination circuit 408 makes a determination as to whether or not a location pointed to by the ADDR (USER) is within a specified address area. If it is determined that the location pointed to by the ADDR (USER) is not within the specified area, the reference numeral 408 transmits 0 to the reference numeral 409, and also transmits a value of a PC-ADDR (START) to the adder 404. If it is determined that the location pointed to by the ADDR (USER) is within the specified area, the reference numeral 408 transmits 1 to the reference numeral 409, and also transmits a value of the PC-ADDR (START) to the adder 404. On the receipt of the signal in question, the reference numeral 409 transmits to the adder 404 the random number stored in the R-BUF. The adder 404 calculates the sum of both, and then transmits its value to the AND operation unit 406 where a logical product of the received value and a value of the reference numeral 405 is calculated. The calculated value is stored in the ADDR-BUF. (Because this is the same as the extraction of only lower m bits of an output of the reference numeral 404, the adder 404 has only to calculate up to the m-th bit—if m is fixed, such a configuration may also be used). The value of the ADDR-BUF agrees with (ADDR (USER)−ADDR (START)+R) mod M.

If it is determined that the location is not within the specified area, the reference numeral 409 receives the signal 0 of the reference numeral 408, and transmits the value 0 of the zero buffer 410 to the adder 404. At this time, a value of the ADDR-BUF becomes ADDR (USER)−ADDR (START). In other words, the address does not change.

Because the relative locational relation with the ADDR (START) is shown, an actual physical address ADDR (PHYS) is a location that cyclically differs from an original location only by R. For example, if ADDR (USER)+R is included in a specified area, this directly becomes ADDR (PHYS) as shown in FIG. 5. If ADDR (USER)+R exceeds the specified area, as shown in FIG. 6, in a part exceeding the specified area, a physical address is set at a location that deviates from the ADDR (START) only by the size of a remainder.

What is considered here is a case where the M-th power of 2 is used. However, if general M which does not exponentiate 2 is used, dividers are provided instead of using the reference numerals 405 and 406. This is an embodiment in which M is extended, and has an advantage of enabling fine area specification.

In this embodiment, while a one-to-one correspondence between a physical address and an address specified by a program is kept unchanged, the address is changed at random. As a result, the determination of an address is free from continuity, and accordingly an enhanced effect of providing untraceability is produced. Therefore, it is possible to reduce the relevance between data processing and the electric current consumption in an information processing unit. If the relevance between the electric current consumption and processing of a chip is reduced, it becomes difficult to predict processing in the information processing unit and an encryption key thereof from an observed waveform of the electric current consumption.

To be more specific, according to this embodiment, it is possible to provide a tamper resistant information processing unit having a high level of security such as an IC card.

Incidentally, although the present invention is applied to an IC card in this embodiment, it is needless to say that the present invention can be applied to an information processing unit, and the like, other than IC cards.

Second Embodiment

An embodiment which will be described next is characterized by the simplest correspondence between a physical address and a logical address, and an enhanced effect of providing untraceability. Here, let n stand for the number of bits. The difference in kind of memory is usually determined by high-order bits of an address. For the sake of simplification, this embodiment is based on the assumption that a RAM area corresponds to the whole area, the most significant bit of which is 1. In other words, the RAM area has a size of $2^{(n-1)}$ bits.

This embodiment includes the undermentioned components. To be more specific, this embodiment includes: a program counter buffer 701; a random number generator 702; a random number buffer 703; a determination circuit 704 for judging whether or not a location pointed to by a program counter is within a specified area; a selector 705; a zero buffer 706; an exclusive OR operation circuit 707; and a physical address buffer 708. Here, a value 0 is stored in the zero buffer. Because this is a fixed value, it is not necessary to use a register as the zero buffer. However, a register is used here for the sake of simplification. The reference numeral 707 performs exclusive OR operation of n bits. In addition, although a R-BUF is a buffer having n bits, the most significant bit is always 0. How these components are connected to one another is as shown in FIG. 7.

A value of the program counter is stored in the program counter buffer 701. If the most significant bit of the value of the program counter is 0, the determination circuit 704 transmits 0 to the selector 705. On the other hand, if the most significant bit is 1, the determination circuit 704 transmits 1 to the selector 705, and transmits the value of the program counter to the exclusive OR operation circuit 707. If the signal in question is 1, the reference numeral 705 transmits a value (random number) of the R-BUF 703 to the reference numeral 707. The value of the R-BUF is supplied from the random number generator 702. Here, as the timing of newly storing in the R-BUF the random number R generated by the random number generator 702, there are two ways: (1) before newly starting processing which includes secret information after a reset is made; and (2) if data in a memory (an area to which a random offset is applied) is not made use of in processing thereafter, before newly starting processing which includes secret information after data in a memory is released.

Now, if the most significant bit of the PC (Program Counter (logical address)) is 1 (if the address points to the RAM), the determination circuit 704 transmits a signal of 1 to the selector 705. Accordingly, the selector transmits a random number stored in the R-BUF to the reference numeral 707. In the reference numeral 707, exclusive OR operation between a random number R of the R-BUF and the value of the program counter PC is performed, and the obtained value is then stored in the ADDR-BUF 708. This value becomes a physical address. Unless R is 0, this physical address becomes a value that differs from a logical address.

If the most significant bit of the PC is 0 (if the address points to a location other than the RAM), the determination circuit 704 transmits a signal indicating 0 to the selector 705. Accordingly, the selector transmits a value of 0 stored in the ZERO-BUF to the reference numeral 707. In the reference numeral 707, exclusive OR operation between 0 and the value of the program counter PC is performed, and the obtained value is then stored in the ADDR-BUF 708. Because the exclusive OR operation with 0 does not change an original value, the original PC value becomes a physical address. Although this embodiment has a limitation of a RAM area that can be specified, the determination of an address is in general free from continuity, and therefore an enhanced effect of providing untraceability is produced.

Third Embodiment

If the present invention is used in combination with a technique by which data is located in a manner that an address constantly changes, it is possible to achieve higher security. For example, a part of the RAM to which the method according to the present invention is applied is a target area that is subject to the DPA attack. On the other hand, for a part of the RAM that becomes a target of an attack method by which internal information is extracted by directly observing an electric current instead of using a statistical method, it is possible to securely handle a wider range of internal data by locating data in a manner that an address constantly changes. As a result, the security is improved.

For example, this embodiment can be configured as blow.

Here, addresses of the RAM area range from C000 to CFFF in hexadecimal notation. In the example of the extension of M described in the first embodiment, an information processing unit in which an applied area ranges from C900 to CFFF is considered. The following program is considered under this condition.

(Hereinafter, the program of this embodiment will be described in the assembler language of the H8 microcomputer. However, configurations of microcomputers are essentially the same, and the difference in instruction set is not essential. More specifically, similar effects can be produced by describing the program in other assembler languages. As for the H8 microcomputer and the assembler therefor, refer to, for example, "The Complete Manual of H8 Microcomputer" by Yukiho Fujisawa, Ohmsha, 2000.

What is considered here is a program for, if 2-bit data d is '00', '01', '10', '11', transmitting data Y0, Y1, Y2, Y3 to a data register CDB of a certain coprocessor respectively. Y0, Y1, Y2, Y3 are data each having the same length DATA_LENGTH, and are stored in advance in specified locations of the RAM (in FIG. 8, 804 to 807). Start addresses of the data are Y0_TOP, Y1_TOP, Y2_TOP, Y3_TOP. Additionally, a start address of the CDB is CDB_TOP (in FIG. 8, 808).

Further, the start addresses are determined so as to satisfy the following condition:

$$Ham(Copy, Y0\_TOP) = Ham(Copy, Y1\_TOP)$$
$$= Ham(Copy, Y2\_TOP)$$
$$= Ham(Copy, Y3\_TOP)$$

(condition 1)

For example, if DATA_LENGTH=1024/16=64, Copy=0100, Y0_TOP=C200, Y1_TOP=C400, Y0_TOP=C700, and Y0_TOP=C800, the following equations hold:

$$Ham (Copy, Y0\_TOP)=Ham (0100, C200)=4$$
$$Ham (Copy, Y1\_TOP)=Ham (0100, C400)=4$$
$$Ham (Copy, Y2\_TOP)=Ham (0100, C700)=4$$
$$Ham (Copy, Y3\_TOP)=Ham (0100, C800)=4$$

At the same time, each data is located on the RAM without duplication, and the (condition 1) is satisfied at each stage of word transfer.

A program described below is formed of three parts. A first part is a main part that uses "MAIN" as its start address (label). A second part is a transfer subroutine that uses "Copy" as its start address. A third part is a data part that uses "table" as its start address. The first and second parts are located in a ROM or an EEPROM (in FIG. 8, 802 and 803). When executing the program, MAIN is first taken for a value of the program counter.

[Program 1]

```
/*** MAIN ***/
MAIN:
0000 MOV. W @d, R2
0002 SHLL R2
0004 MOV. W @(table, R2), R0
0006 MOV. W #CDB_TOP, R1
0008 MOV. B #DATA_LENGTH, R3H
000A JSR Copy
/*** Copy Routine ***/
Copy:
0100 MOV. W @R0, R4
0102 MOV. W R4, @R1
0104 ADDS #2, R0
0106 ADDS #2, R1
0108 DEC. B R3H
010A BNE Copy
010C RTS
/*** table ***/
table:
0200 .DATA. W Y0_TOP ;(=C200)
0202 .DATA. W Y1_TOP ;(=C400)
0204 .DATA. W Y2_TOP ;(=C700)
0206 .DATA. W Y3_TOP ;(=C800)
```

The operation of this program will be described with reference to the above [program 1] and FIG. 8.

Figure 8:
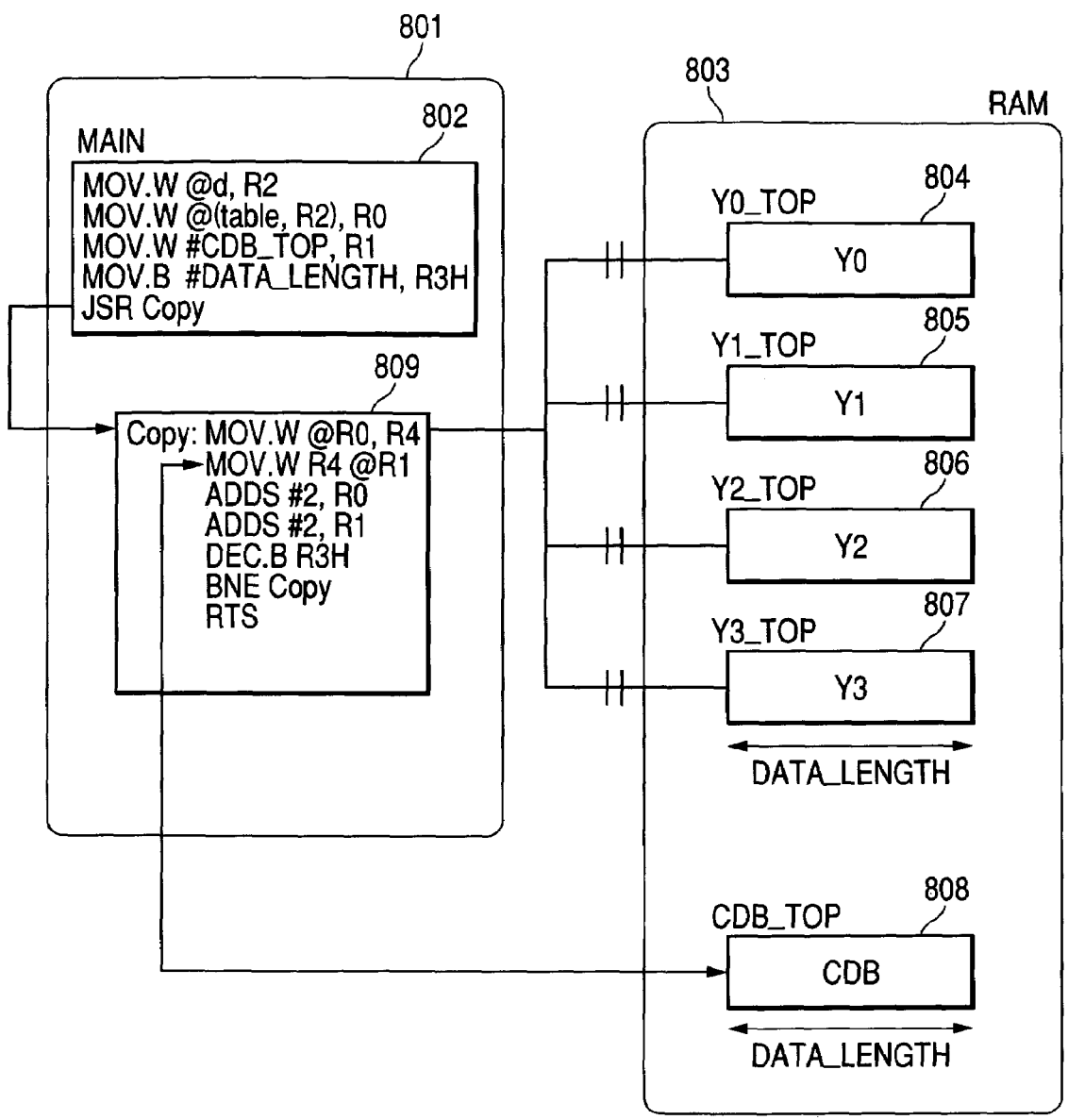
FIG. 8 is a diagram illustrating a part of a program by which the change in address is kept constant, according to a third embodiment of the present invention.

The relationship between the program and the data is illustrated in FIG. 8. The CDB functions as part of the RAM.

Because the program counter initially points to MAIN=0000, a microcomputer sequentially executes instructions from MOV. W @d, R2.

At 0000, the microcomputer reads out d having a length of 2 bits from a specified address, and then stores d in a register R2. At 0002, a value of the register R2 is shifted left by 1 bit. This operation is equivalent to doubling the value of R2. At 0004, the microcomputer transmits, to a register R0, data that is stored at an address obtained by adding a value of R2 to table=0200. For example, if a value of d is 3, what is stored in R0 is an address C800 that is pointed to by data Y3_TOP stored in an address of 0200+2*3=0206.

At 0006, the start address CDB_TOP of the CDB is stored in the register R1. At 0008, a word length of data, that is to say, DATA_LENGTH=64, is stored in a register R3H. At 000A, an instruction of JSR Copy causes a value of the program counter to change to 0100 (label name "Copy"). At 0100, data pointed to by an address stored in the R0 is transferred to a register R4. At 0102, a value of the R4 is transferred to a location pointed to by an address stored in the R1. At 0104, 0106, the address is incremented only by 2. At 0108, a counter value stored in the register R3H is decremented only by 1. At 010A, the program counter is changed again to the top of the copy routine unless the counter value is 0. The above-mentioned operation is repeated until the value of the register R3H becomes 0. When the value of the R3H becomes 0, the program counter changes to 010C, causing the subroutine to return. As a result, the program counter changes to the address subsequent to 000A, that is to say, 000C, where the processing ends.

As a result of the move instruction at the address 0100, the program counter at the time of reading the data Y0, Y1, Y2, Y3 changes from 0100 to R0. In this case, the hamming distance between a value included in the R0 and 0100 is always the same.

To be more specific, if d=0, the hamming distance es as follows:

0100→C200 (hamming distance 4)
0100→C202 (hamming distance 5)
0100→C204 (hamming distance 5)
. . .
0100→C080 (hamming distance 4)

If d=1, the hamming distance changes as follows:

0100→C400 (hamming distance 4)
0100→C402 (hamming distance 5)
0100→C404 (hamming distance 5)
. . .
0100→C480 (hamming distance 4)

The change in hamming distance is completely the same as that in the case of d=0. It is obvious that the hamming distance changes in like manner also in the case of d=2, 3.

Accordingly, from C900 to CFFF, as a result of an effect produced in the example of the extension of M shown in the first embodiment, an electric current is generated every time an address randomly changes. On the other hand, as for the processing (program 1) that uses part of an area from C000 to C900 (part in which Y0 through Y4 are stored), an electric current generated when an address changes becomes constant regardless of data as described above. As a result, in the processing that uses the area from C000 to C900, the change in address is small, which makes it difficult to read out an address from the electric current. In the area from C900 to CFFF, it is possible to hinder internal data from being read out by statistical processing of the electric current such as DPA.

Here, "encryption" and "randomization", which are characteristic terms in the specification of the application concerned, will be described for easier understanding of the explanation below.

The "encryption" is operation that uses a certain encryption key to cause certain data to change according to a certain rule. In the "encryption" operation, the encryption key is held inside an encryption device. Accordingly, the encryption key will never be transmitted or transferred together with encrypted data. Because the security of cryptography in general encryption algorithm depends on an encryption key, basically the encryption key will never be output outside the device. Therefore, even if an attacker observes encrypted data outside the encryption device, the attacker cannot obtain information about the encryption key. To securely share an encryption key between two parties, the Diffie-Hellman key exchange method (refer to Alfred J. Menezes, Paul C. van Oor. Vanstone, "HANDBOOK of APPLIED CRYPTOGRAPHY", CRC press, p. 516) and a method using public key encryption are used.

In the meantime, the "randomization" used in the specification of the application concerned means any one of (1), (2), (3) as follows: (1) concatenating, with a randomization key, the result of encrypting data by use of the randomization key; (2) performing nonlinear transformation of concatenated data obtained by concatenating data with a randomization key; and (3) concatenating, with a randomization key, the result of encrypting data by use of the randomization key, and further performing nonlinear transformation of the concatenated data.

Incidentally, in the "randomization" of (1) and (3), a role of the randomization key is the same as that of the encryption key from the viewpoint of encryption of data. However, if attention is paid to a point that a key is transmitted together with encrypted data, the randomization key differs from the encryption key used in "encryption". Because of this, if an attacker acquires data accurately, it is possible as a principle to identify a randomization key, and data or encrypted data. In this respect, the encryption can be said to essentially differ. However, a randomization device according to the present proposal performs randomization so that it is difficult to estimate the randomization key and the data unless transmitted data formed of randomized data and a randomization key is sufficiently observed. As for the randomization, because a randomization key is transmitted together with data or encrypted data, the length of transmitted data is in general n+m bits, which is the sum of the bit length n of the randomization key and the bit length m of the data.

Ways of thinking to solve problems, on which the present invention is based, are classified into the following three categories:

(1) Randomization of Data

A first mode is a mode in which by randomizing data that is transmitted/received through a data bus between an information processing unit and an information storage device, the correlation between original data and power consumption is prevented from being established. The transmission side A of the bus is provided with a randomization/restoration device 1; and the receiving side B is provided with a randomization/restoration device 2. The receiving side is further connected to the information storage device. Incidentally, the randomization/restoration device 2 which is placed on the receiving side B may also be placed inside the information storage device. At the time of data transmission, the randomization/restoration device 1 on the transmission side A is used to perform randomization by use of a randomization key KA that is set. Then, the randomized data is transmitted to the receiving side B. On the receiving side B, the randomization/restoration device 2 is used to perform restoration by use of a randomization key KB that is set. Then, the restored data is transmitted to the information storage device. The information storage device stores the received data. By differently setting the randomization key KA used on the transmission side A and the randomization key KB used on the receiving side B, the restoration processing on the receiving side B outputs a value D' differing from real data D that has been previously randomized. Even if transmitted data is probed on a bus line to try to read out the data, it is not possible to know how data stored in the information storage device is actually configured. Accordingly, it is not possible to identify a location of the data stored in the information storage device on the basis of the data read out on the bus line. When reading out data from the information storage device, the randomization/restoration device 2 is used to randomize, by use of the randomization key KB, the data that has been read out. Then, the randomized data is transmitted to the randomization/restoration device 1 through the bus line. Because the randomization/restoration device 1 performs the restoration by use of the randomization key KA, it is possible to obtain the real data D as a result.

As randomized data, there are three kinds of forms. A first form is a form obtained by concatenating, with a randomization key, the result of encrypting, by use of the randomization key, data to be randomized. A second form is a form obtained as a result of transforming, by a nonlinear transformation device, data obtained by concatenating, with a randomization key, data to be randomized. A third form is a form obtained as a result of further transforming the randomized data of the first form by a nonlinear transformation device.

In the first and third forms, because data is transformed into an unpredictable form by the randomization key, an attacker cannot predict a form of transmitted data. Because the analysis of electric current consumption requires prediction about a form of the transmitted data, it is possible to effectively prevent such analysis from being performed. As for the second form, because the hamming weight of data does not change, this form does not serve as complete measures against the electric current consumption analysis. However, concatenating with a randomization key results in the decrease in signal-to-noise ratio of a data dependency component in electric current consumption, which produces an effect of hindering the attack from being carried out. To be more specific, bit extension using a randomization key has an effect of improving the tolerance to the analysis of electric current consumption.

In contrast to Japanese Patent Application Laid-Open No. 2000-507072, according to a method disclosed in the present invention, the receiving side, that is to say, the information storage device side, is also provided with a randomization/restoration device, and a randomization key set on the transmission side is also different from that set on the receiving side. In addition, although in the Patent Document 2 the encryption is performed using an encryption key, the method disclosed in the present invention performs randomization that essentially differs from encryption.

Moreover, if physical restrictions including, for example, a point that correct hardware probing must be performed for randomly wired minute buses, are taken into consideration, it is difficult for an attacker to correctly observe transmitted data, and therefore it is difficult to practically carry out an attack.

Although the receiving side B is further connected to the information storage device, there is also a case where by placing an external communication device between the receiving side B and the information storage device, data is transmitted outside with randomization being kept.

(2) Randomization of Wiring Selection at the Time of Bit Transfer

A second mode is a method whereby when transmitting and receiving data, a wire used to transmit and receive a certain 1 bit is selected from among a plurality of wires at random. The correspondence of a wire with a data bit is determined on the basis of a randomization key.

The number of bits which is in general used as a unit of data to be handled in the information processing unit is a multiple of 8. In a general information processing unit, $d_0, d_1, \ldots, d_7$ are given to bits of data d starting from a high-order bit, and $d_0, d_1, \ldots, d_7$ correspond to bus lines 0 through 7 respectively. This is because a further decrease in delay in data transmission can be achieved by shortening the wire length as much as possible, and because the identification of a bus line number at the time of debugging and testing can be facilitated by wiring in a regular manner. According to the present invention, the correspondence between data d and a bus line number at the time of transmitting/receiving data is changed at each data transmission. Moreover, the correspondence between the both is so configured that the nonlinear relationship is established. Configuring the correspondence so as to establish the nonlinear relationship makes it possible to create a state in which even if a bus line is observed a plurality of times in different timing, information about data before the data is randomized cannot be easily acquired. As a result, the tamper resistant is improved.

Because the correspondence between a bit number of data and a bus line number changes at each data transmission, even if an attacker observes a single bus line by probing, the attacker cannot know a bit number of a bit that is currently being observed. To be more specific, this means that even if the attacker observes all bus lines, information which can be acquired is only a hamming weight of data unless the attacker knows algorithm specifying the correspondence between a data bit number and a bus line number. If a 64-bit bus line is used, there are $_{64}C_h$ kinds of data corresponding to hamming weight h. For example, in the case of h=32, which is the most possible case, the number of candidates of corresponding data is $_{64}C_{32}=2^{60.7}$. Accordingly, it is practically impossible to search all possible candidates. Moreover, because the microcomputer is finely machined, the number of bus lines which can be observed at a time is limited due to restrictions of the probe size, and therefore it becomes remarkably difficult to actually carry out an attack.

(3) The width of a data bus used when transmitting/receiving data of a bit error detected at the time of transmission using an error detection code is increased. Then, the error detection code is transmitted together with the data. On the receiving side, the validity of the error detection code is checked; and if necessary, error detection processing is performed. If an error is included, an error signal is output.

A random number independent of transmitted data may also be adopted as the error detection code. In such a case, the same random number is shared or generated also on the receiving side. According to the above-mentioned method, paying attention to a fact that a bus line number used for data transmission differs from a bit number of data depending on transmitted data, if a random number is used as an error detection code, the correspondence between a bit number and a bus line number changes every time even when transmitting the same data. This makes it possible to improve the tamper resistance. With the object of sharing the same random number, a random number generated on the transmission side may be transferred to the receiving side through a bus line, or well known pseudo-random number generators such as LFSR can also be used.

When a random number generated on the transmission side is transmitted to the receiving side through the bus line, even if a transmitted random number is attacked and changed on a bus line by an attacker, an error is quickly discovered when subsequently transmitting data because of the inconsistency of a shared random number between the transmission side and the receiving side. Accordingly, it is not necessary to take special measures for ensuring the security of data integrity on the bus line when sharing a random number. This point is an advantage of the present invention, which cannot be achieved by the method that uses conventional encryption. If pseudo-random number generators are used, the pseudo-random number generators are initialized so that each pseudo-random number generator outputs the same series of pseudo-random numbers. In addition, the pseudo-random number generators are so configured that the same number is obtained in the same timing. The easiest method is to configure the pseudo-random number generators to start operation from the same initial value, and then to successively output a series of random numbers in the same clock timing.

Instead of using a random number, an error detection code may also be used by generating the error detection code depending on transmission data. In this case, because the same error detection code is generated for the same data, a randomization effect of data cannot be produced. However, further performing the randomization of transmission data in combination according to (1) makes it possible to perform the randomization of data. If an error correction code is used instead of an error detection code, the validity of the error correction code is checked on the receiving side. If data includes an error, it is possible to try the recovery from the error.

First Embodiment

In this embodiment, placement of a data transform device at the time of storing data in a memory device from a CPU will be described.

Here, the data transform device is a device that performs nonlinear transformation of data. Data transform devices usually have a function of changing bit expression itself of data. There is another case where a data transform device has a function of changing bit expression itself of data and also has an order transform function of transforming the correspondence between a bit number of data and a number of a bus. Changing of bit expression means that the hamming weight of an image (D) by transformation F of a certain data D, the number of which is at least one, is different from that of D. The transformation of order means that all D are transformed so that the hamming weight of F (D) always agrees with that of D. The transformation of data is in general a union of a case where the bit expression is changed and a case where the order is changed. Therefore, in the present invention, both of them are called a data transform device as a rule. If it is particularly necessary to designate them differently, the former is called a bit-pattern-transform device, and the latter is called a bit-order-transform device.

Even if only a data-order-transform device is used, it is possible to achieve the tamper resistance to hardware probing. Accordingly, if a data transform device is merely described as a component, this also means that the part in question is read as a data-order-transform device to configure as such.

Figure 13:
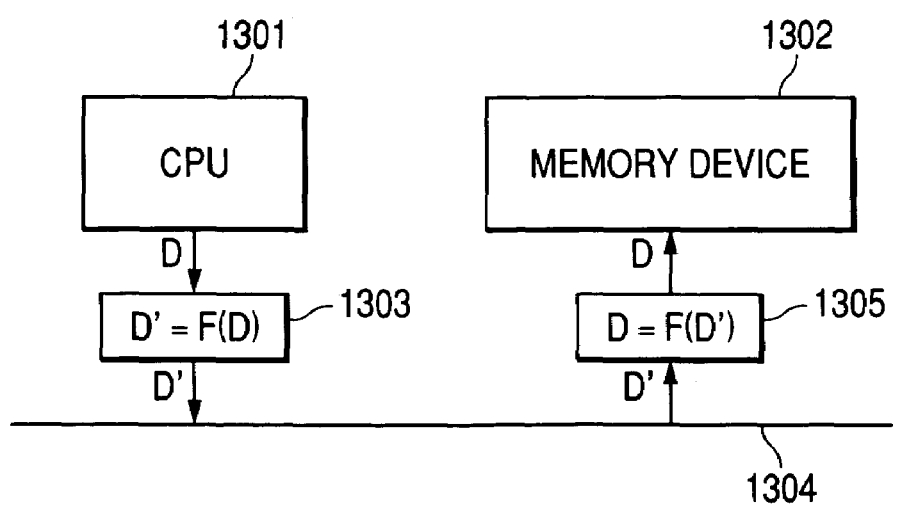
FIG. 13 is a diagram illustrating data transform steps at the time of storing data D in a memory device from a CPU.

As shown in FIG. 13, when a CPU 1301 stores data D in a memory device 1302, the data D is sent from the CPU to a data bus 1304. To begin with, the data D is inputted into a data transform device 1303. Then, the data transform device 1303 transforms the data D by transformation processing F to output data D'. The data D' is inputted into a data transform device 1305 through a data bus 1304. The data transform device 1305 transforms the data D' into the data D by the transformation processing F to output the data D. The data D is stored in the memory device 1302.

Here, the data transform devices 1303 and 1305 perform the same data transformation processing F. As a result, reference numeral 403 obtains D' from D'=F (D); and the reference numeral 1305 obtains D from D=F (D'). If it is so configured that the transformation and the restoration are performed as different processing, it is necessary to place a device for transformation and a device for restoration on the CPU 1301 side and on the memory device 1302 side respectively. The scale of the device, therefore, is almost doubled as compared with the configuration of this embodiment. As an example of the transformation F as described in this embodiment, there is interchange processing that interchanges bit positions of data D. An example of the interchange processing is such processing that D [i] (i∈I) is interchanged with D [j] (j∈J) on the assumption that D [i] expresses the i-th bit of D for I⊂{1, ..., n}, J⊂{1, ..., n}, where |I|=|J|=n/2, I∩J=φ and I∪J={1, ..., n}. Obviously, repeating this interchanging twice returns bit positions to an original state. In addition, as shown in FIG. 14, transformation INV which determines an inverse element in GF($2^n$) can be used as the transformation F. The determination of an inverse element means that D' is determined so that certain data D and D' satisfy an equation of the form: D×D'=1. In general, D' is also expressed as $D^{-1}$. If the data D is a 32-bit number, the data D is an element of GF($2^{32}$). For example, by use of irreducible polynomial $m(x)=x^{32}+x^7+x^6+x^2+1$, the data D' is obtained according to D'=F(D)=$D^{-1}$ mod m(x). D can be obtained by transmitting the data D' to a data transform device 1404 through a data bus 1403, and then by handling D' with F in the data transform device 1404. This is because the undermentioned relationship holds.

$F(D')=\text{mod } m(x)=(D^{-1})^{-1} \text{ mod } m(x)=D$

Second Embodiment

An embodiment shown in FIG. 15 is an example in which a data transform device is extended, and further untraceability of data is achieved by performing addition of key data R and data expansion before performing inverse calculation INV, prior to data transformation processing in the data transform function. Here, the above addition means logical addition D'=D xor R. After completing the above processing, the data-bit length is extended by concatenation of the data D' with R, and thereby an input into the inverse calculation INV, which is a data transform function, is obtained. The concatenation is parallel connection of the data D' with R. This means that data, the bit length of which is equivalent to the sum of the bit length of both data, is obtained. This is expressed as D'|R. Data D0 output from a CPU 1501 is inputted into a data transform device 1502. The data transform device 1502 further comprises a key addition function 1503, a data expansion function 1504, and an inverse calculation function 1505. In the key addition function 1503, a key R0 is added to the data D0, and consequently D0' is formed. After the data expansion function 1504 concatenates D0' with R0 to form D1, the data transform function (that is to say, the inverse calculation function 1505 here) transforms the D1 into D2. The D2 is inputted into a next data transform device 1507 through a data bus 1506. The data transform device 1507 includes a key addition function 1508 and an inverse calculation function 1509. In the key addition function 1508, a key R1 is added to the data D2, and consequently D3 is formed. The inverse calculation function 1509 then transforms the D3 into D4. The D4 is stored in a memory device 1510. Here, it is to be noted that the addition processing and the inverse calculation are performed by GF($2^n$). More specifically, the addition corresponds to exclusive OR operation. Incidentally, performing the exclusive OR operation twice cancels each other.

When reading out data, the steps described above have only to be applied completely in the reverse direction.

This can be understood because judging from D4=(((D0+R0)|R0)$^{-1}$+R1)$^{-1}$ mod m(x), the processing in the reverse direction results in as follows:

$$t = \left((D4^{-1} + R1)^{-1} \text{mod } m(x)\right) + R0$$
$$= t\left(\left(\left(((D0+R0)^{-1}+R1)^{-1}\right)+R1\right)^{-1} \text{mod } m(x)\right) + R0$$
$$= t\left(((D0+R0)^{-1} + R1 + R1)^{-1} \text{mod } m(x)\right) + R0$$
$$= t((D0+R0) | R0)) + R0$$
$$= D0 + R0 + R0$$
$$= D0$$

Here, t (x|y) is processing that excludes y to narrow the bit length; and this processing corresponds to inverse transformation of data expansion.

Configuring the devices as described in this embodiment enables both protection of data passing through the data bus 1506 and concealment of data stored in the memory device 1510, using the data transform devices 1502 and 1507 each having a different key. In this embodiment, the data transform devices 1502 and 1507 are described as if they are independent devices. However, because the order of key addition and data expansion can be interchanged, the data transform devices 1502 and 1507 can be configured in the same manner if the data expansion function 1504 is provided outside the data transform device 1502. In this case, because only the keys differ from each other, the data transform devices 1502 and 1507 can also have a configuration in which commonality of most processing functions is provided and only a register holding a key differs from the other. Configuring them in such a manner makes it possible to achieve a further reduction in circuit size.

Third Embodiment

Figure 16:
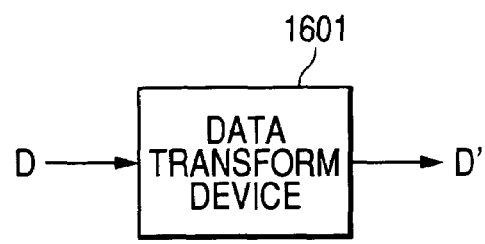
FIG. 16 is a diagram illustrating a basic data transform device.
Figure 17:
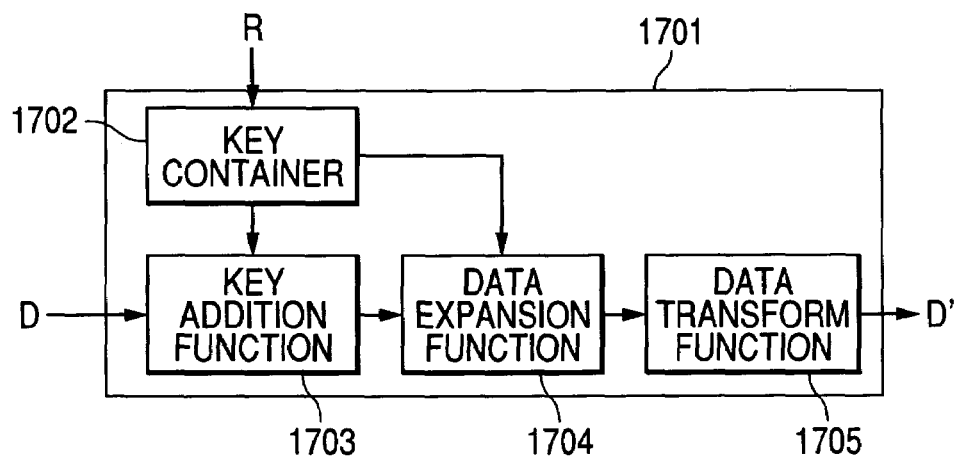
FIG. 17 is a diagram illustrating a data transform device comprising a key addition function and a data transform function.
Figure 18:
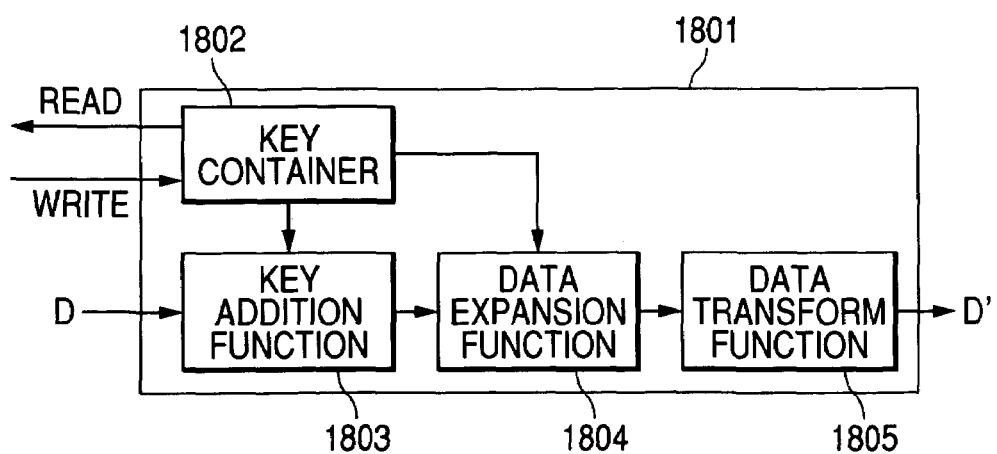
FIG. 18 is a diagram illustrating a data transform device comprising a key input-output bus.
Figure 19:
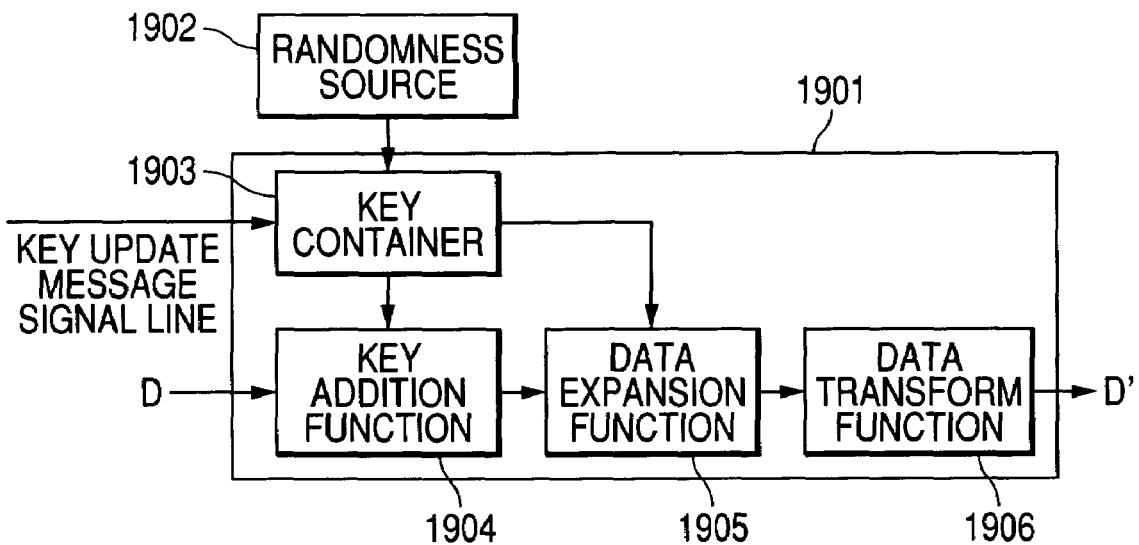
FIG. 19 is a diagram illustrating a data transform device that is configured to obtain a key from a randomness source.

This embodiment shows an example of how a data transform device is configured. A basic data transform device has only a data transform function 1601. As shown in FIG. 16, the data transform device receives data D, and then performs data transformation before outputting data D'. However, a configuration as illustrated in FIG. 17 may also be used. More specifically, a data transform device 1701 further receives data R as an input. The data R is treated as a key, and accordingly the key is stored in a key data storing register 1702. The key is added to data D in a key addition function 1703. A data expansion function 1704 then expands the data by combining the result of the addition and the key R. After that, the expanded data is inputted into a data transform function 1705, which outputs the transformed data as D'. FIG. 18 is a configuration example in which data R can be read out. If key data which is concatenated with data changes as a result of an attack, it becomes impossible to perform transformation that returns data D' to data D. If there is a possibility that key data will change, key data is read out in appropriate timing, and then a check is made as to whether or not the key data has changed. If the key data has changed, the key data is written through a write line. On the other hand, as shown in FIG. 19, a data transform device 1901 uses a key data randomness source 1902 as a destination that receives key data. The data transform device 1901 updates a key stored in the key container 1903 by a signal from a key update message signal line. As a result of configuring the data transform device 1901 in this manner, nobody can predict or operate data transformation done by the data transform device 1901, making it possible to achieve the higher security of data D' transmitted through a bus. In this case, it is desirable that the data transform device 1901 be so configured that data of the key container cannot be read out. The damage of data caused by the difference in key between the generation of data D' and the restoration of data D can be detected by use of a parity, an error detection code, and the like. As a matter of course, also in this case, the data transform device 1901 can be so devised that data of the key container 1903 can be read and written. The use of a more complicated key, for example, determining update timing of a key at random, is also a possible method for achieving the higher security of data.

Figure 20:
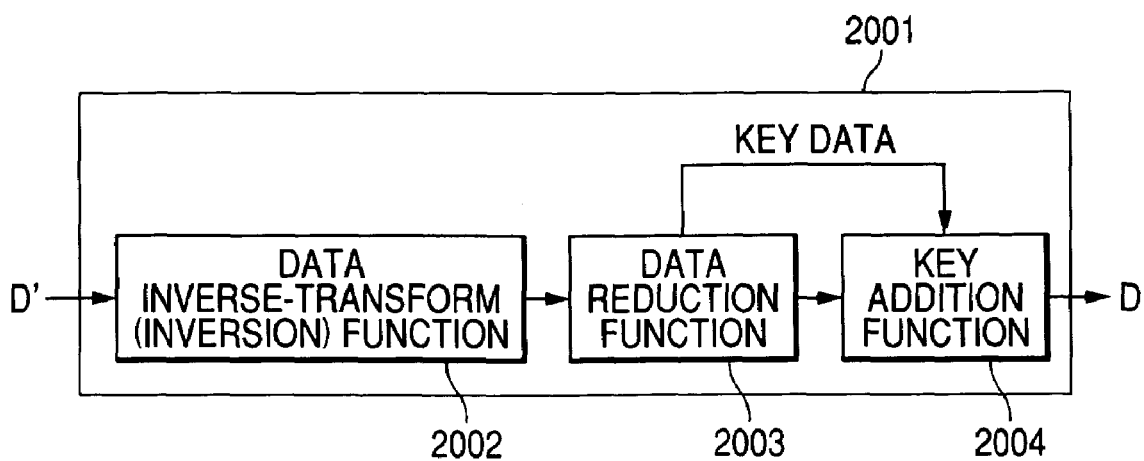
FIG. 20 is a diagram illustrating a data transform device that cancels data transformation.

Up to this point, data transformation by the data transform device was described. Next, cancellation of data transformation by a data transform device will be described with reference to FIG. 20. The cancellation of data transformation is processing that restores original data D from data D' transformed by a data transform function. The D' inputted into the data inverse-transform function is transformed by a data inverse-transform function 2002, and is then inputted into a data reduction function 2003. The data reduction function separates the input into data and key data, each of which is inputted into a key addition function 2004. The key addition function adds the key data to the data, and then outputs the result as D. Here, processing of the data inverse-transform function is the same as that of the data transform function at the time of data transformation. Because data obtained as a result of data inverse transformation is concatenation of data with key data, for which the key addition has been performed, a key data reduction function separates the obtained data into them. Processing of the key addition function 2004 is logical addition. Because the addition at the time of the data transformation is logical addition, it is possible to obtain original data D by this processing. If encryption by common key cryptography is used as key addition at the time of data transformation, the key addition here corresponds to decode processing by the same common key cryptography. The key data obtained by the data reduction function is used in the subsequent key addition function. In addition to it, as described in the undermentioned embodiment, there is a case where the key data is discarded, and there is also a case where the key data is used to detect and correct a data failure during data transmission.

Fourth Embodiment

Figure 21:
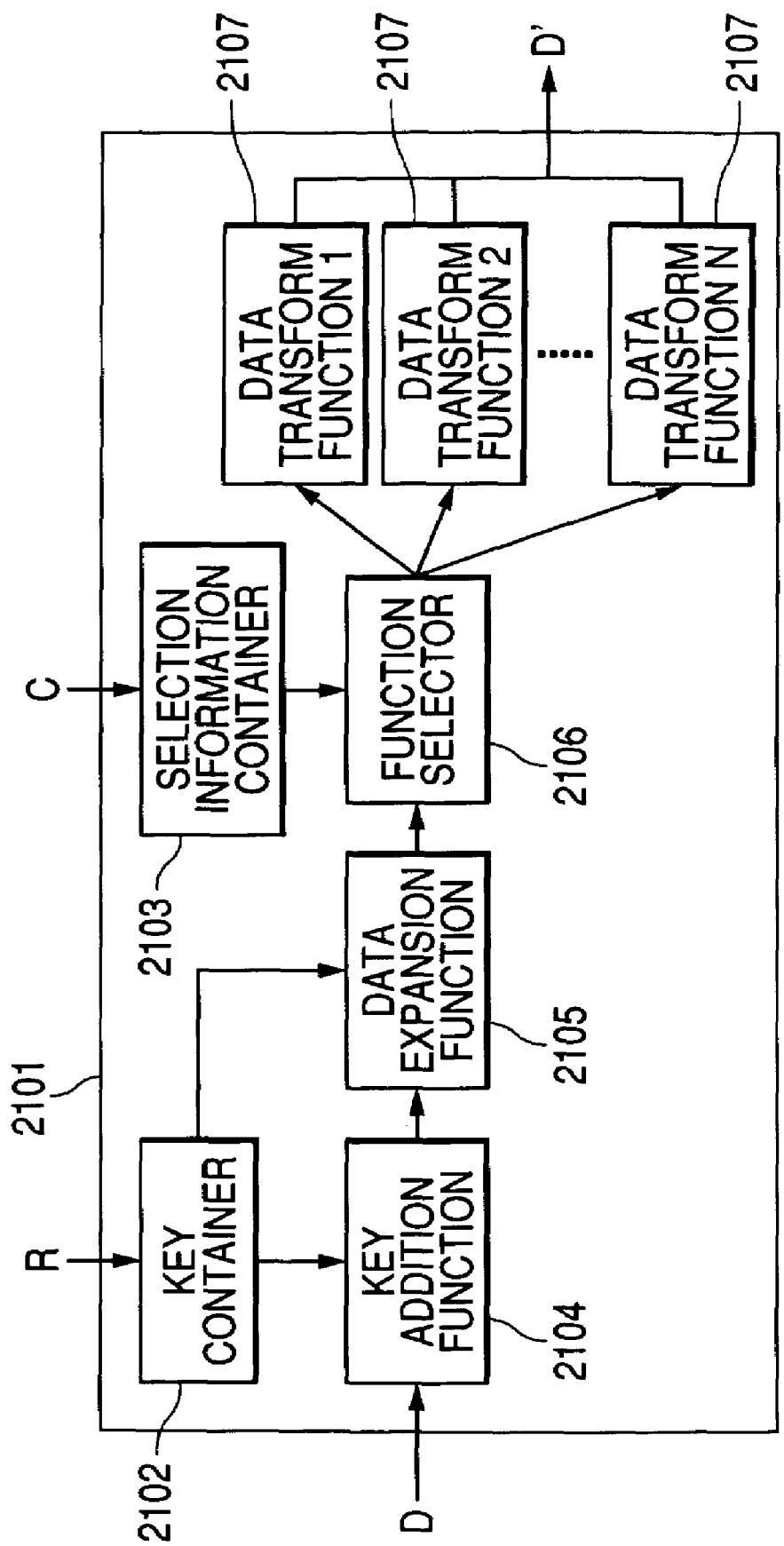
FIG. 21 is a diagram illustrating a first example of a data transform device having a plurality of data transform functions.

In an embodiment shown in FIG. 21, a data transform device 2101 has a plurality of data transform functions 2107. Data R is stored in a key container 2102; data C is stored in a selection information container 2103; and data D is inputted into a data transform device 2101. A key addition function 2104 adds the data R stored in the key container 2102 to the data D, and then inputs the result of the addition into a data expansion function 2105. A function selector 2106 passes the result of the data expansion function 2105 to one or more data transform functions 2107 selected from among a plurality of data transform functions 2107 according to the data C stored in the selection information container 2103. The data transform function 2107 transforms the received data, and outputs the transformed data as data D'. In this case, for the purpose of preventing information about the selected data transform function 2107 from leaking out by the behavior including operating current of a device, it is possible to increase noise by operating N from all of data transform functions 1 irrespective of contents of the data C.

Figure 22:
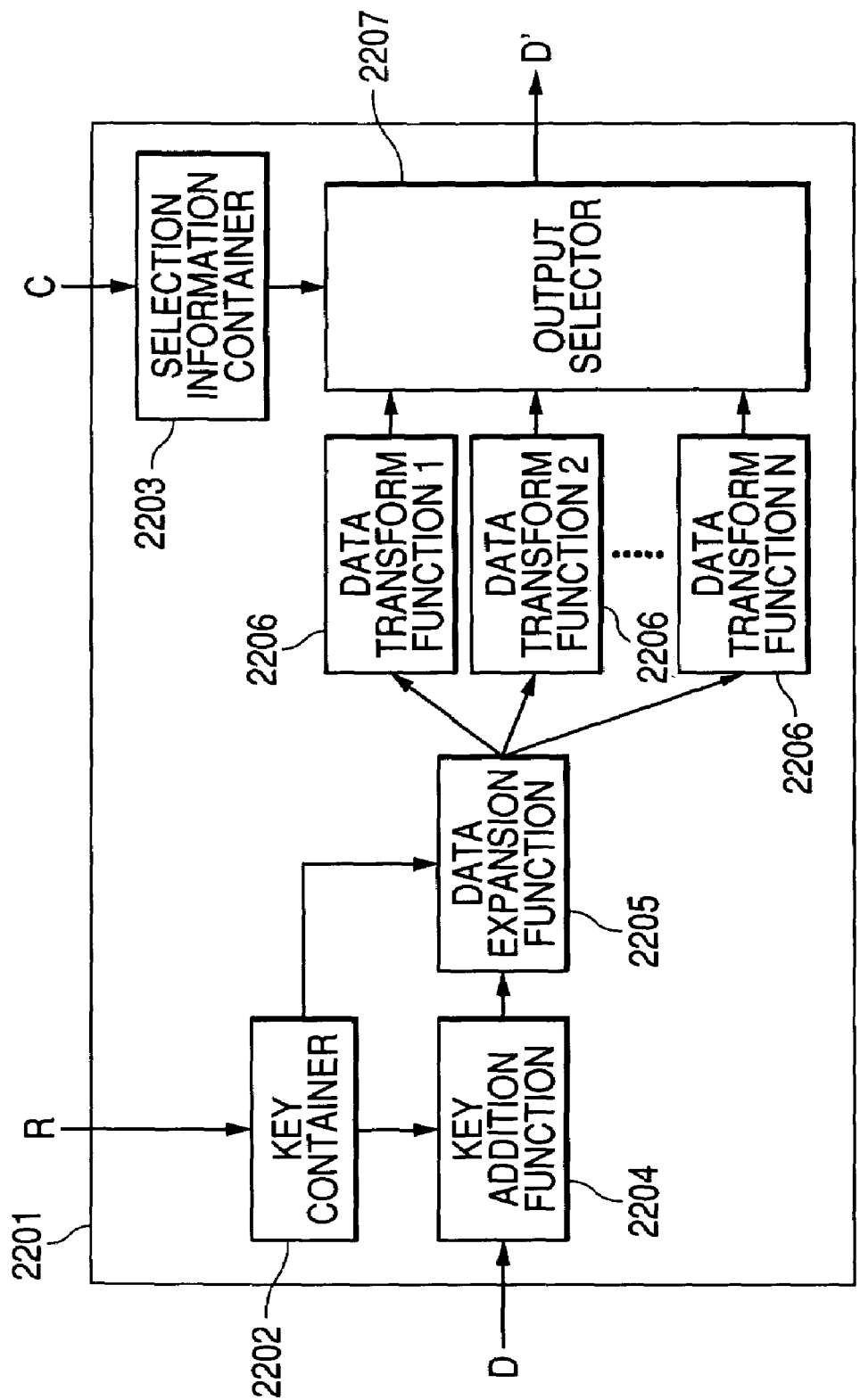
FIG. 22 is a diagram illustrating a second example of a data transform device having a plurality of data transform functions.

In the meantime, a configuration as illustrated in FIG. 22 may also be adopted. To be more specific, a key addition function 2204 adds data R stored in a key container 2202 to data D. The data D is then inputted into all of 1 through N of data transform functions 2206 via a data expansion function 2205. An output selector 2207 selects one of outputs from 1 through N of the data transform functions 2206 according to data C stored in a selection information container 2203, and then outputs the result of the selection as data D'. In this case, because the output selector 2207 operates with electric current being slightly consumed as compared with the data transform functions 2206, it becomes difficult to make a judgment on the basis of the electric current consumption, and the like.

Figure 23:
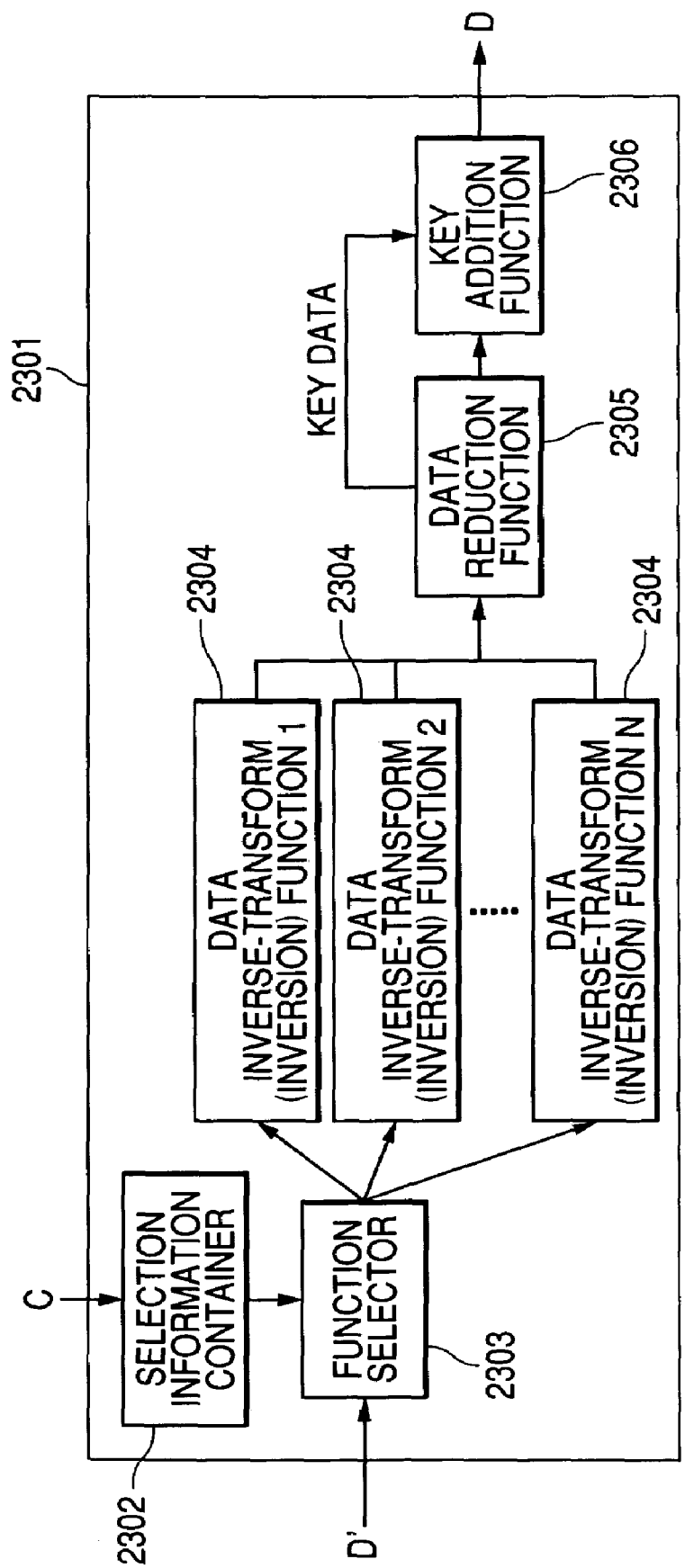
FIG. 23 is a diagram illustrating an example of a data transform device having a plurality of data inverse-transform functions, at the time of canceling data transformation.

FIG. 23 is a diagram illustrating a data transform device at the time of canceling data transformation corresponding to FIG. 21. A data transform device 2301 receives data D', and then selects one of data inverse-transform functions 2304 according to processing selection information C used at the time of data transformation in the function selector. As is the case with the embodiment described above, the data inverse-transform function 2304 performs inverse transformation of data transformation. Data obtained as a result of the data inverse transformation is separated into data and key data by a data reduction function 2305. A next key addition function 2306 makes an addition. The result of the addition becomes original data D. As described above, the addition can be substituted for common key cryptography. The data transform device at the time of canceling data transformation corresponding to FIG. 22 can also be configured in like manner. Obviously, it is not always necessary to combine FIGS. 21 and 23. The data transformation in FIG. 22 may also be combined with the cancellation of data transformation in FIG. 23, or the data transform device in FIG. 21 may also be combined with the cancellation of data transformation corresponding to FIG. 22.

This embodiment described the data transform device used in combination with the key container, the key addition function, and the data expansion function. However, in actual specifications, it is not always necessary to implement the data transform device in combination with them. It is because even the data transform function requires an attacker to carry out many trial-and-error processes. Accordingly, even if no key addition is made, it is possible to judge that the sufficient security is ensured.

Fifth Embodiment

Figure 24:
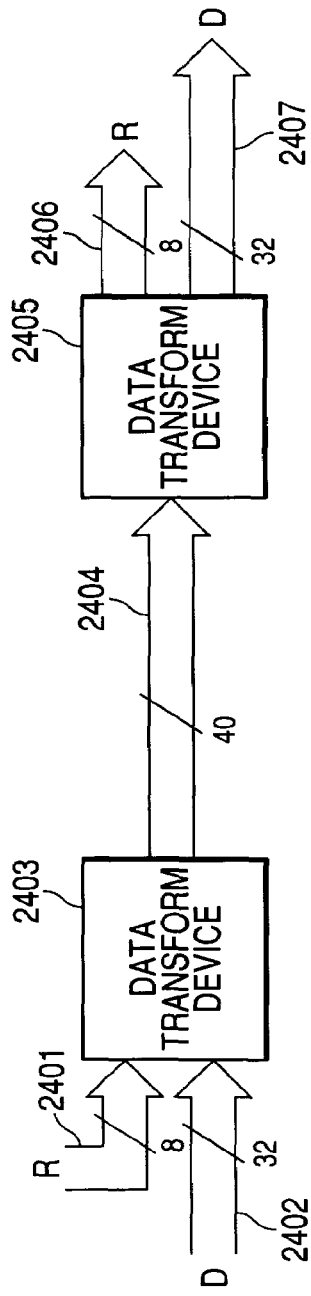
FIG. 24 is a diagram illustrating an information processing unit that provides untraceability of data in a bus line by inputting both data D and a random number R into a data transform device.

In the embodiment shown in FIG. 24, when transmitting data D through the data bus 2404, a data transform device 2403 transforms data D together with data R. The transformed data is passed through a data bus 2404, and is then inputted into a data transform device 2405. The data transform device 2405 performs inverse transformation of the data transform device 2403 to obtain the data R and the data D.

Here, the data R is used as a random number obtained from a randomness source, the data passing through the data bus 2404 changes every time even in the case of the same data D. Accordingly, there is no correlation between the data D and the data passing through the data bus 2404, which makes it possible to protect against an attack using the analysis of electric current consumption, or the like. What is more, even if probing of the data bus 2404 is tried to read data, it is difficult to predict the data D because the data R is unknown. In the example shown in FIG. 24, the data D is a 32-bit number, and the data R is a 8-bit number. Because the data transform device 2405 restores the data D and the data R, an output of the data transform device 2403 should be constituted of 40 bits or more. In this case, even if the data R is unknown, it is possible to limit the data D to 256 different candidates judging from 40 bits obtained by probing the data bus 2404. However, when considering data formed of a plurality of blocks, data formed of n blocks, each having 32 bits, has $256^n$ different candidates. Therefore, it is practically difficult to predict data formed of 8 blocks or more (256 bits or more). As a matter of course, this embodiment is not intended to limit the bit length of the data D and that of the data R. The bit length of the data R is increased, or the bit length of the data D is decreased to increase the number of blocks. Thus, it is possible to further hinder data from being predicted by trying all possible candidates. In this embodiment, the data R which is an output of the data transform device 2405 may also be discard just as it is.

Figure 25:
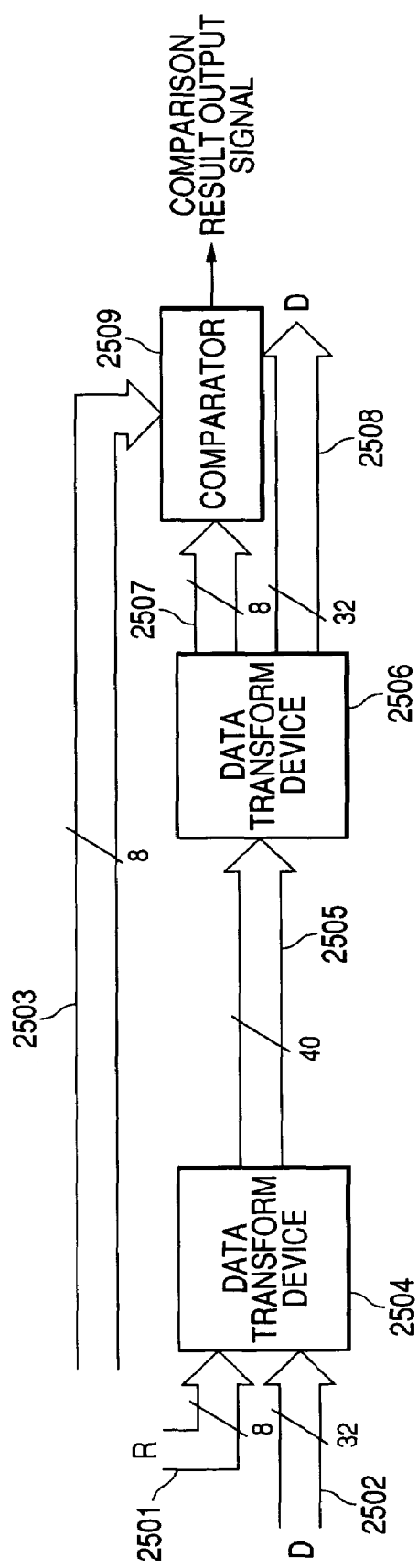
FIG. 25 is a diagram illustrating an information processing unit that is configured to provide untraceability of data in a bus line, and also to detect a data error.

On the other hand, as shown in FIG. 25, data R is transmitted through a data bus 2503. If a comparator 2509 makes a comparison between the data R and an output of a data transform device 2506, it is possible to produce a randomization effect of data transmitted through a data bus 2505, and also to detect, for example, a change in data at the time of transmission. The change in data is caused by the damage of data occurring due to electric conditions, intentional data corruption by an attacker, or the like. In particular, there is an example in which cryptanalysis is carried out by data corruption. As described in the embodiment in FIG. 25, verifying that data is correct, and performing proper error handling according to the result of the comparison, make it possible to protect against such cryptanalysis. Increasing the bit length of the data R makes it possible to achieve higher error detection performance.

In the example described here, the data R is shared between the data transmission side and the data receiving side through the data bus. However, by using two pseudo-random number generators that are synchronized with each other, data transmission can be eliminated. When setting an initial value of the pseudo-random number generators, it is possible to use a data bus according to the present invention.

Sixth Embodiment

Figure 26:
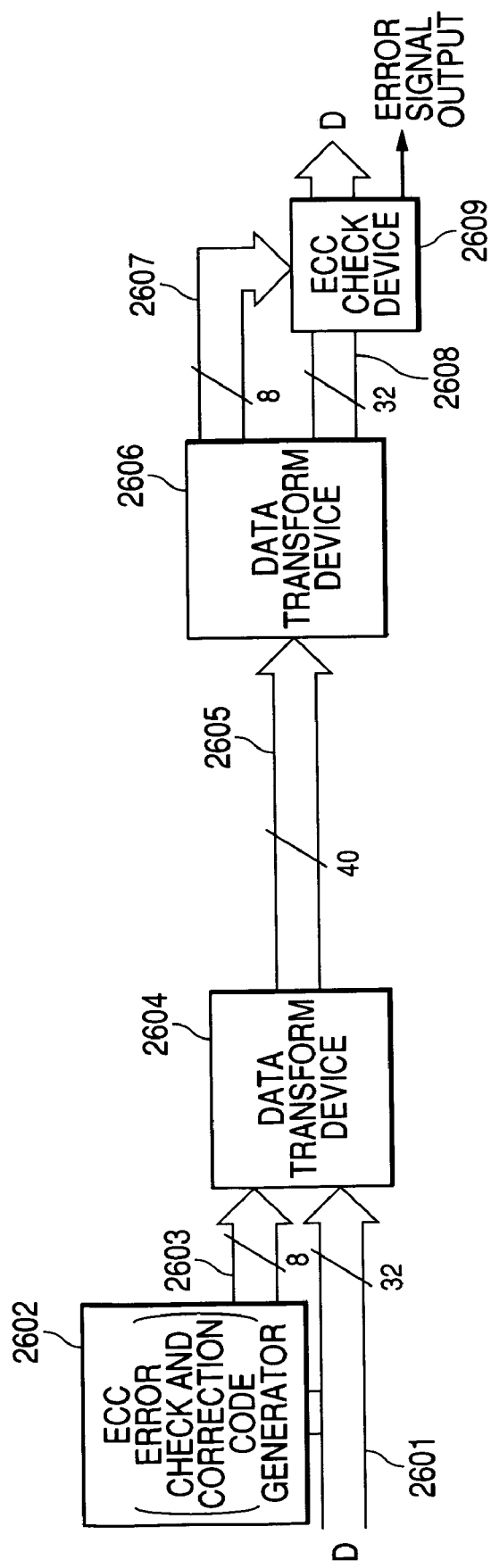
FIG. 26 is a diagram illustrating an information processing unit that is configured to provide untraceability of data in a bus line by use of an error correction code, and also to detect and correct a data error.

In an embodiment shown in FIG. 26, data D branches off from a data bus 2601. The branching data D is connected to an error correction code (ECC) generator 2602, which generates an ECC code corresponding to the data D. The ECC code and the data D are then inputted into a data transform device 2604 through data bus 2603. Data converted by the data transform device 2604 is inputted into a data transform device 2606 through a data bus 2605. The data transform device 2606 separates the input data into the data D and the ECC code. The ECC code and the data D are inputted into an ECC check device 2609 through data buses 2607 and 2608 respectively. The ECC check device 2609 corrects an error included in the data D if necessary, and if possible, and then outputs the corrected data D. Further, if the data D includes an error, the ECC check device 2609 notifies of the occurrence of the error through an error signal output line.

Here, the error signal output line does not always output only an error signal. If an error is not included, the error signal output line may output a signal indicating that data has been successfully transmitted. Even if an error occurs, the error signal output line may output a signal indicating whether or not the error can be corrected. Thus, such a configuration makes it possible to manage data more appropriately.

Seventh Embodiment

Figure 27:
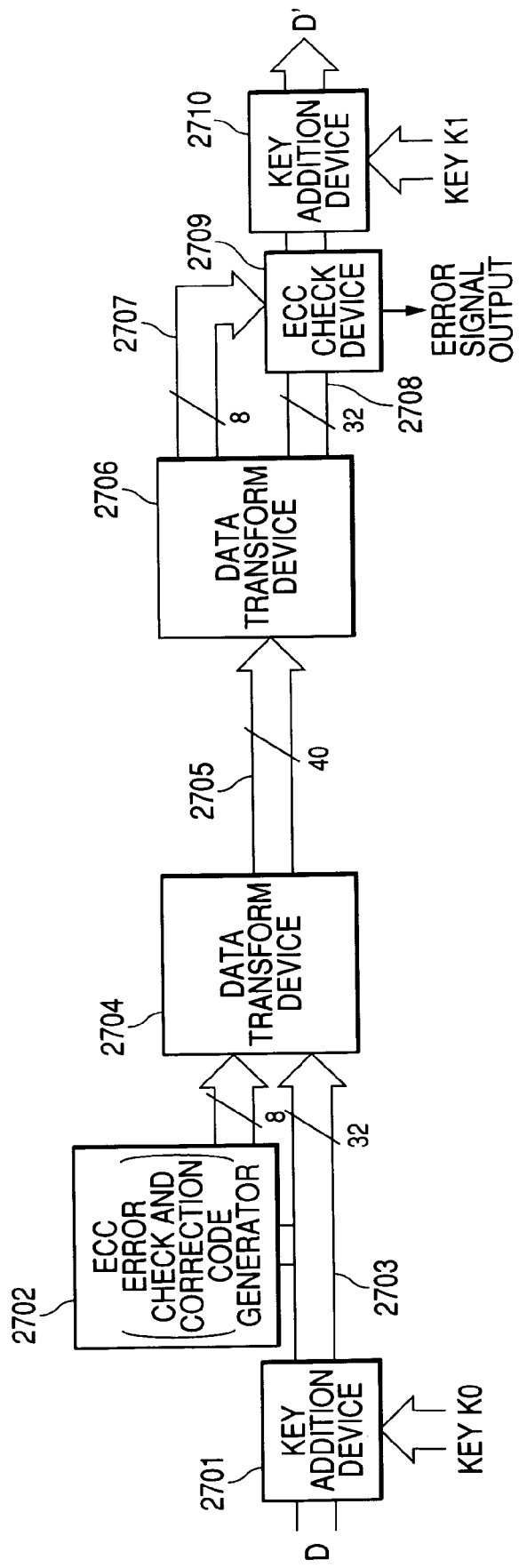
FIG. 27 is a diagram illustrating an information processing unit that is configured to provide untraceability of data in a bus line further by making a key addition.

In an embodiment shown in FIG. 27, when transmitting data D, a key addition device 2701 adds a key k0 to the data D. The result of the addition is then inputted into a data transform device 2704 through a data bus 2703. In addition, the data bus 2703 is connected to an ECC generator 2702. The ECC generator 2702 generates an error correction code according to the input data. The error correction code is inputted into a data transform device 2704 through a data bus. The data transform device 2704 performs data transformation according to two inputs, and the transformed data is then transmitted to a data transform device 2706 through a data bus 2705. The data transform device 2706 separates the input data into two, and then transmits the two pieces of data to an ECC check device 2709 through data buses 2707 and 2708. Here, the two pieces of data correspond to the two pieces of data inputted into the data transform device 2704. To be more specific, one is the data obtained as a result of adding the key K0 to the data D, and the other is an error correction code corresponding to it. On the basis of the two pieces of data, the ECC check device 2709 performs error correction if necessary, and then passes the result of the error correction to a key addition device 2710. If an error included in the data is detected, the ECC check device 2709 notifies of the occurrence of the error through an error signal output line. The key addition device 2710 adds a key K1 to the received data, and outputs data D'. In this embodiment, changing the key K0 at random causes data passing through the data bus 2705 to be randomized even if the data D is a fixed value. Therefore, even if an attacker monitors the data bus 2705, the attacker cannot acquire the data D. Moreover, if the key K0 is made equivalent to the key K1, the data D becomes equivalent to the data D'. In this case, in this embodiment, after the key addition device 2701 adds the key K0 to the data D, the ECC generator 2702 generates the error correction code. However, even if the order of the above processes is reversed, it is also possible to ensure the security of transmitted data in the same manner. More specifically, an error correction code of the data D is first generated, and then the result of adding the key K0 to the data D is inputted into the data transform device 2704. Also as for the output of the data transform device 2706, the key K1 is added to the data (on the assumption that K1=K0) before the ECC check device 2709 performs error check and error correction.

Figure 28:
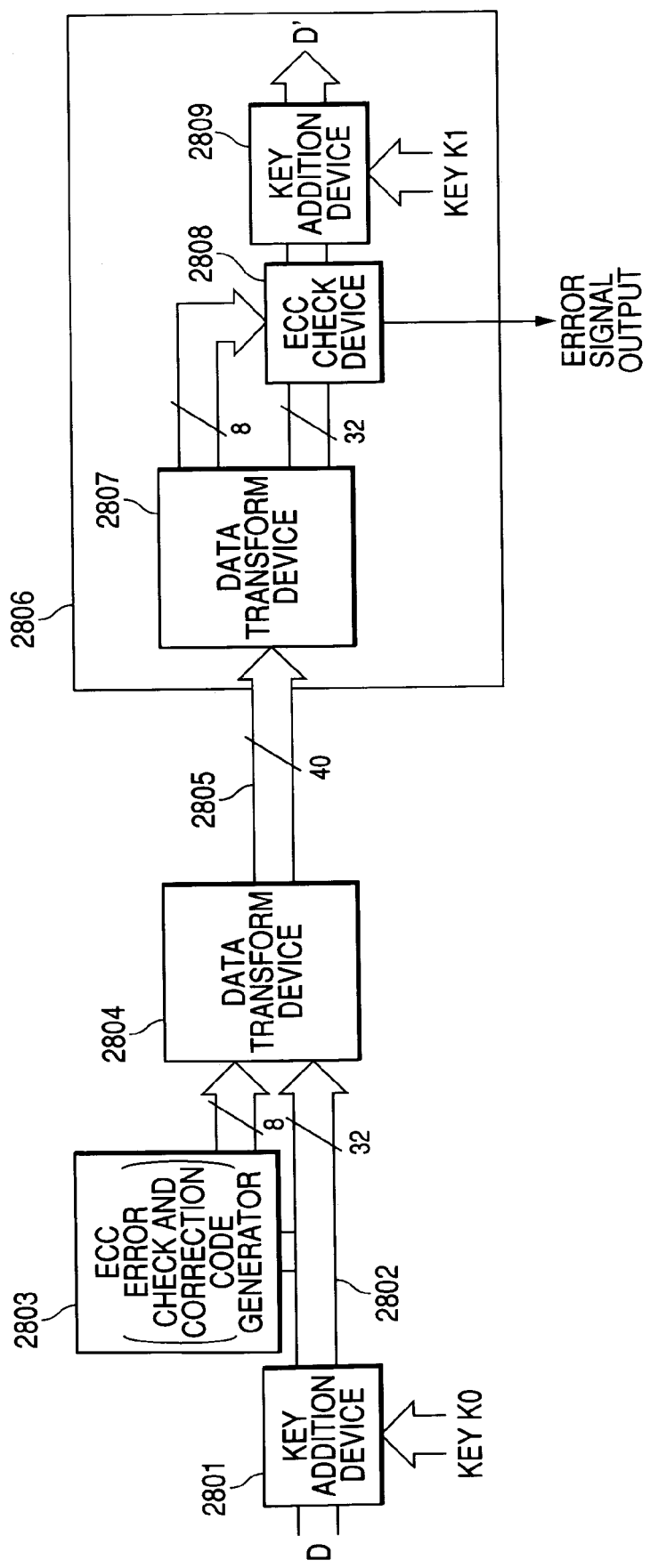
FIG. 28 is a diagram illustrating an information processing unit that has a configuration in which a data transform device, an ECC check device, a key addition device are integrated inside a memory device.

An embodiment shown in FIG. 28 in particular describes a case where a destination of data D is a memory device 2806. The memory device 2806 includes inside a data transform device 2807, an ECC check device 2808, and a key addition device 2809. The data transmitted to the memory device 2806 through a data bus 2805 is separated into a data part and an error correction code part by the data transform device 2807. The ECC check device 2808 then verifies that the data part is correct, or corrects the data part. An output of the ECC check device 2808 is passed to the key addition device 2809. After that, the key addition device 2809 outputs data D', which is the result of adding the key K1 to the received data. The memory device 2806 stores the data D'. At this time, if values independent of each other are used as the keys K0 and K1, the transmission side of the data D cannot know a format of actually stored data D'. Thus, even if the data D' stored in the memory device 2806 is read out, it is impossible to predict the data D, making it possible to achieve the high security.

Figure 29:
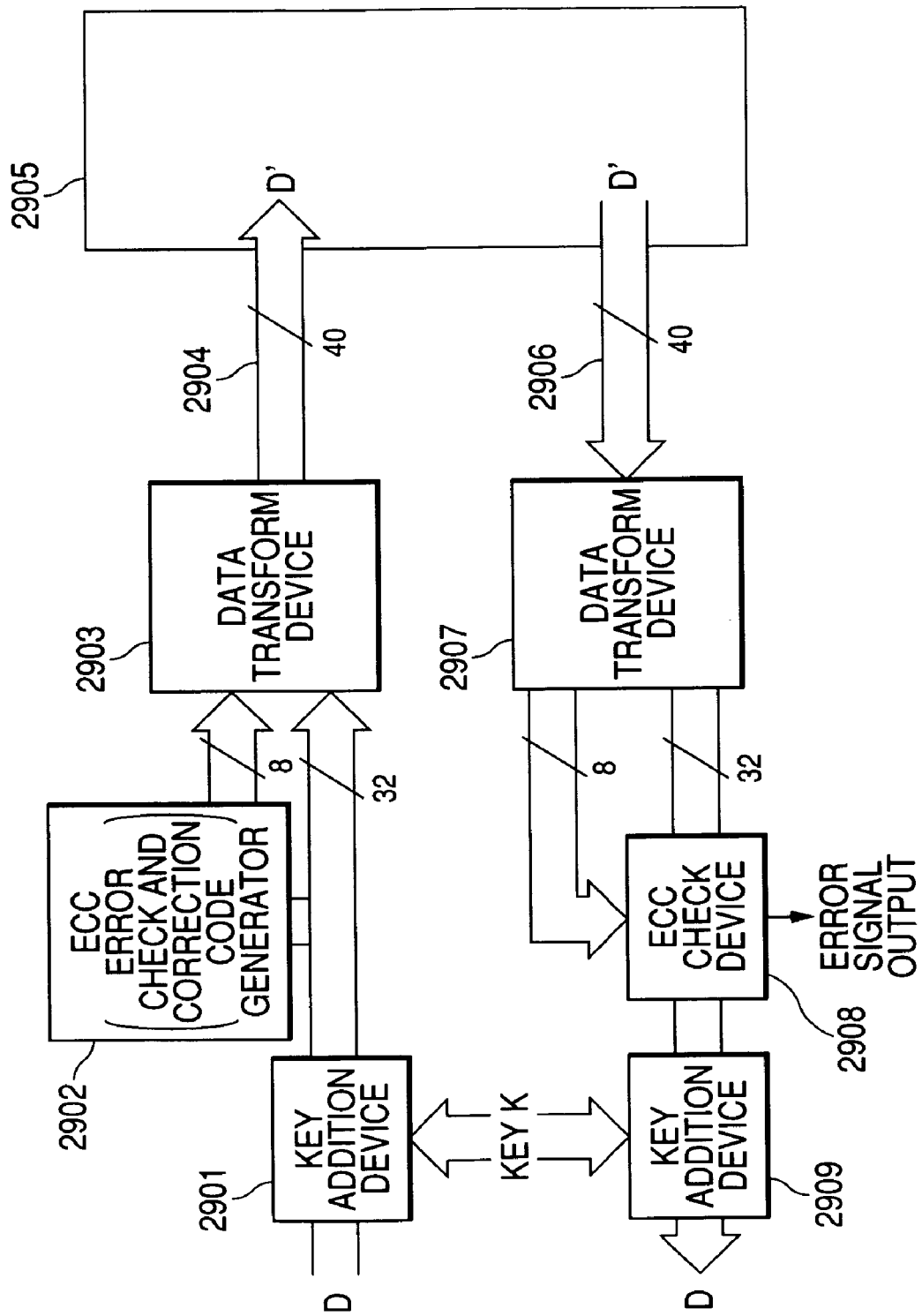
FIG. 29 is a diagram illustrating an information processing unit that is configured to reduce the cost of data transformation by placing a memory device in a bus line.

In an embodiment shown in FIG. 29, on the basis of the result of adding a key K to data D by a key addition device 2901 and an error correction code generated by an ECC generator 2902, a data transform device 2903 performs transformation to obtain data D', which is stored in a memory device 2905 through a data bus 2904. When reading out the data D', the data D' is inputted into a data transform device 2907 through a data bus 2906. The data transform device 2907 separates the data D' into a data part and an error correction code unit, which are then inputted into an ECC check device 2908. The data is corrected as needed, and the key addition device 2909 then adds the key K to the data to obtain data D. An advantage of this method is that the ECC check device 2908 can detect or correct not only a change in data on the data buses 2904 and 2906, but also a change in data in the memory device 2905. The key K corresponds to the data D, and it is not always necessary to fix the key K in the system. For example, if the device is so configured that the key K is generated by a key generator capable of automatically generating a temporary key dependent on a memory address of a memory device or a clock count of a system, the need for managing the key K by users is completely eliminated. Therefore, it is possible to provide a device with a high level of security, for which users need not be conscious of encryption.

Figure 30:
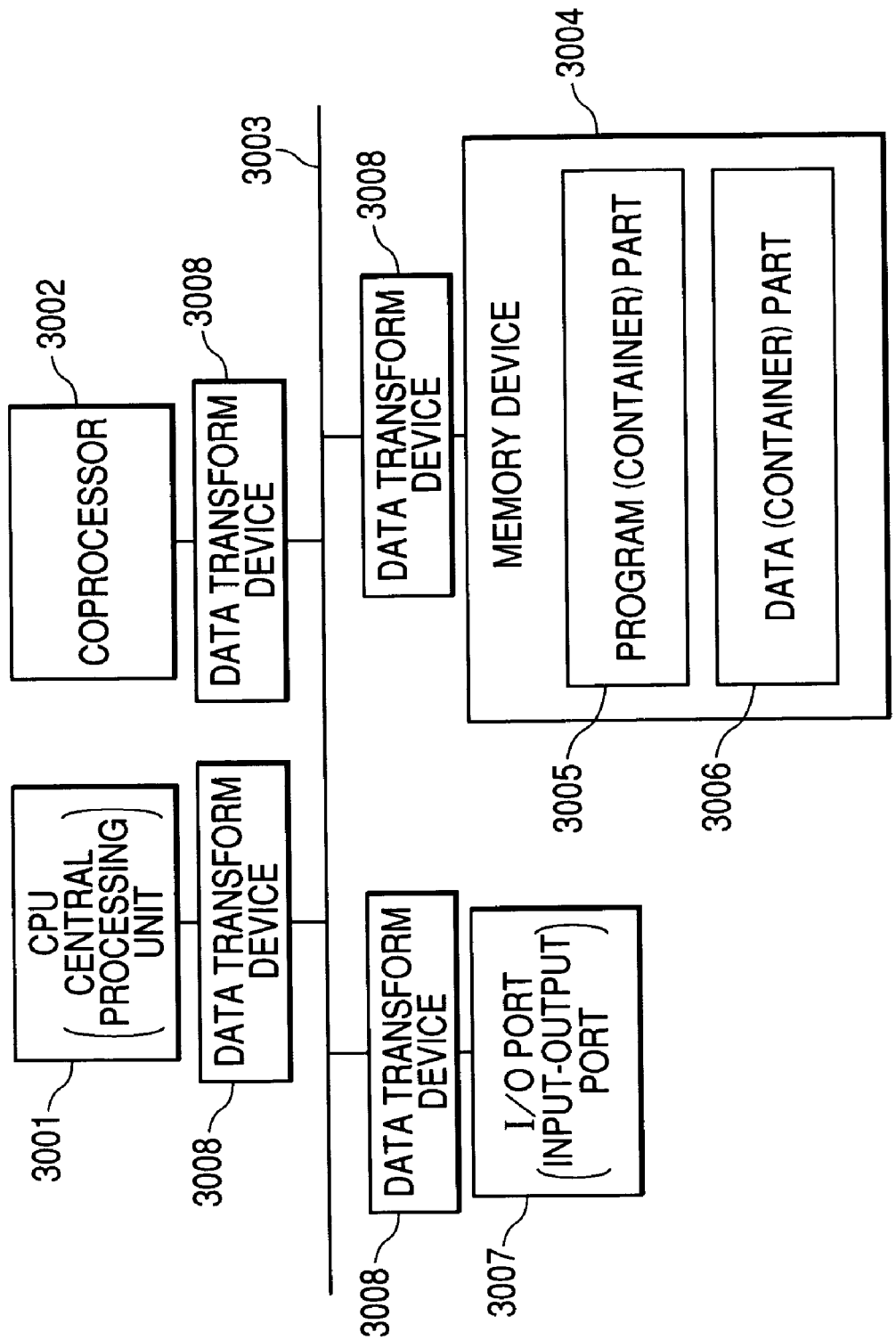
FIG. 30 is a configuration diagram illustrating a microcomputer comprising a data transform device.

FIG. 30 is a diagram illustrating an example of an information processing unit comprising a data transform device. The information processing unit comprises a central processing unit 3001, a coprocessor 3002, an input-output port 3007, and a memory device 3004, each of which is provided with a data transform device 3008. These data transform devices 3008 are taken as measures against the various kinds of attacks described above when data passes through an internal bus 3003. Here, the data transform device 3008 may be configured to include inside the key addition device 2801, the ECC generator 2803, and the ECC check device 2808 as shown in FIG. 28, or to include inside the comparator 2509 as shown in FIG. 25. As shown in the embodiment in FIG. 29, a configuration in which the memory device is not provided with a data transform device can also be used. Data which is transmitted/received through the input-output port 3007 is information that is basically known to an attacker. Therefore, randomization of the data is not always required.

For this reason, by configuring a data transform device placed in the input-output port at minimum level that can merely detect and correct an error, it is possible to reduce an implementation load of the device. In this case, a device for transmitting/receiving data to/from the input-output port has a special mode that performs only error detection and correction.

Figure 31:
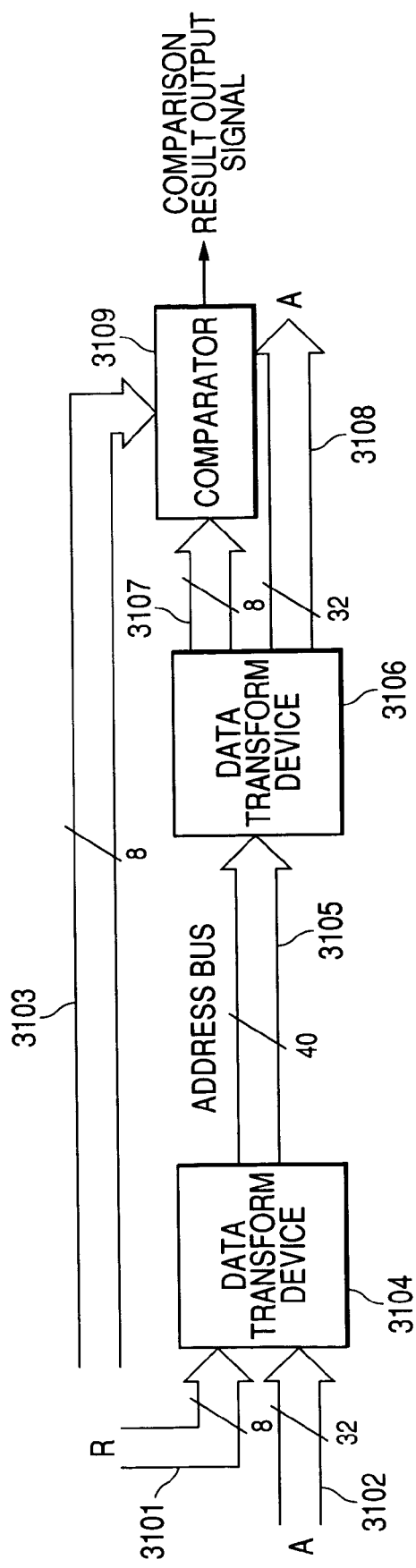
FIG. 31 is a diagram illustrating an information processing unit that is configured to provide untraceability of data in an address bus by use of a random number R, and also to detect an error of data.

In the embodiments described above, processing at the time of transmitting, storing, and reading out data was described. However, what is handled is not always limited to only data. For example, if the embodiments are read by replacing data with an address just as it is, it is possible to obtain the tamper resistance of the address in a similar configuration. Here, FIG. 31 is a diagram illustrating one embodiment in which an address is randomized. In the embodiment shown in FIG. 31, when transmitting an address A through an address bus 3105, a data transform device 3104 transforms the address A together with data R. The transformed data is passed through the address bus 3105, and is then inputted into a data transform device 3106. The data transform device 3106 performs inverse transformation of the data transform device 3104 to obtain the data R and the address A. Here, by using as the data R a random number obtained from a randomness source, the data passing through the address bus 3105 changes every time even in the case of the same address D. Accordingly, there is no correlation between the address A and the data passing through the address bus 3105, which makes it possible to protect against an attack using the analysis of electric current consumption, or the like. What is more, even if probing of the address bus 3105 is tried to read data, it is difficult to predict the data D because the data R is unknown. In the example shown in FIG. 31, the address A is a 32-bit number, and the data R is an 8-bit number. Because the data transform device 3106 restores the address A and the data R, an output of the data transform device 3104 should be constituted of 40 bits or more. In this case, even if the data R is unknown, it is possible to limit the data D to 256 different candidates from 40 bits obtained by probing the address bus 3105. However, when considering data formed of a plurality of blocks, data formed of n blocks each having 32 bits has 256n different candidates. Therefore, it is practically difficult to predict data formed of 8 blocks or more (256 bits or more). As a matter of course, this embodiment is not intended to limit the bit length of the address A and that of the data R. By increasing the bit length of the data R, or by dividing the address A into a plurality of blocks to shorten the bit length of the address A every time the address A is transmitted, it is possible to further hinder data from being predicted by trying all possible candidates. In this embodiment, the data R which is an output of the data transform device 3106 may also be discarded just as it is. After the data R is transmitted through the address bus 3105, if a comparator 3109 makes a comparison with an output of the data transform device 3106, it is possible to produce a randomization effect of data transmitted through the address bus 3105, and also to detect, for example, a change in data at the time of transmission. The change in data is caused by the damage of data occurring due to electric conditions, intentional data corruption by an attacker, or the like. In particular, there is an example in which cryptanalysis is carried out by data corruption. As described in the embodiment in FIG. 31, verifying that data is correct, and performing proper error handling according to the result of the comparison, make it possible to protect against such cryptanalysis. Increasing the bit length of the data R makes it possible to achieve higher error detection performance.

Figure 32:
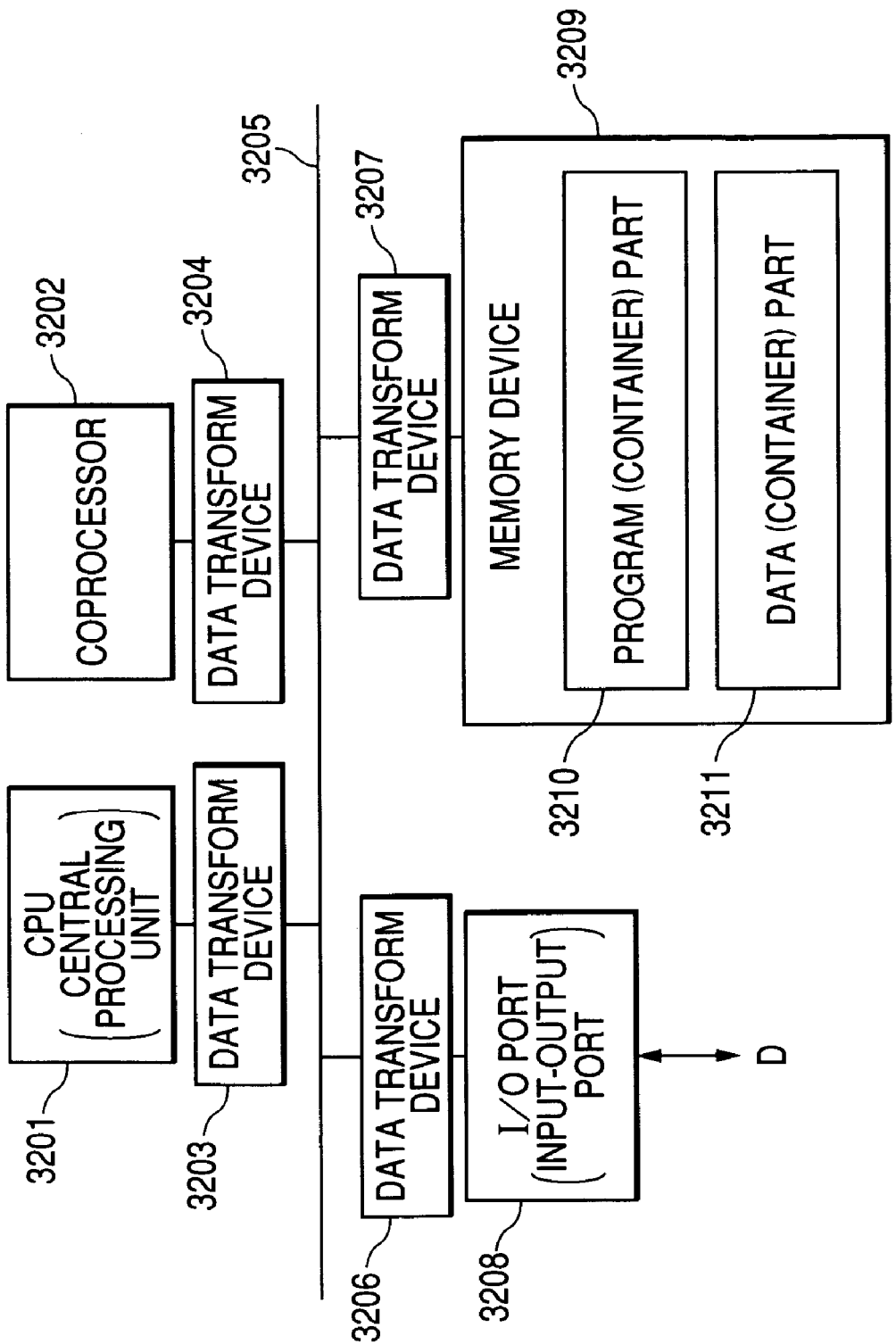
FIG. 32 is a configuration diagram illustrating a microcomputer comprising a data transform device.

A flow of data will be described with reference to FIG. 32. The data D is given to an information processing unit from outside through an input-output port 3208. Incidentally, there is a case where the data D given through the input-output port is stored in a memory device 3209, and there is also a case where the data D is stored in a register included in an central processing unit 3201 or in a coprocessor 3202. If the data D is stored in the memory device, the data D given through the input-output port is transformed by a data transform device 3206. The data D is then passed through an internal bus 3205 to the data transform device 3207 placed on the memory device side, which performs inverse transformation of the data D. After that, the data D is stored in the memory device. If the data D is stored in the register included in the central processing unit, the data D given through the input-output port is transformed by the data transform device 3206. The data D is then passed through the internal bus 3205 to a data transform device 3203 placed on the central processing unit side, which performs inverse transformation of the data D. After that, the data D is stored in the register of the central processing unit. If the data D is stored in the register included in the coprocessor, the data D given through the input-output port is transformed by the data transform device 3206. The data D is then passed through the internal bus 3205 to a data transform device 3204 placed on the coprocessor side, which performs inverse transformation of the data D. After that, the data D is stored in the register of the coprocessor. If the data stored in the memory device is handled by the central processing unit, the data stored in a data container part 3211 of the memory device is transformed by the data transform device 3207. The data is then passed through the internal bus 3205 to the data transform device 3203 placed on the central processing unit side, which performs inverse transformation of the data. After that, the data is transmitted to the register of the central processing unit. If the processing result is stored in the memory device, the processing result is transformed by the data transform device 3203. The result of the transformation is then passed through the internal bus 3205 to the data transform device 3207 placed on the memory device side, which performs inverse transformation. The result of the inverse transformation is then stored in the memory device. If the processing result is handled by the coprocessor, it is also treated in a similar manner. Data transformed by the data transform device 3207 is passed to the data transform device 3204 on the coprocessor side, which performs inverse transformation of the data. The result of the inverse transformation is then transmitted to the register of the coprocessor. The processing result is transformed by the data transform device 3204. Then, the data transform device 3207 placed on the memory device side performs inverse transformation. The result of the inverse transformation is stored in the memory device. If the central processing unit reads out an instruction code from the memory device to execute the instruction code, the instruction code is read out from a program container part 3210 of the memory device, and the instruction code is then transformed by the data transform device 3207. After that, the instruction code is passed through the internal bus 3205 to the data transform device 3203 placed on the central processing unit side, which performs inverse transformation of the instruction code. The result of the inverse transformation is then transmitted to the central processing unit. When extracting the data D to the outside of the information processing unit, the input-output port 3208 is used. In this case, as is the case with the input of data, as a component in which data to be extracted is stored, the register of the central processing unit, the register and the coprocessor, or the memory device is used. If the data is read out from the register of the central processing unit, the data is first transformed by the data transform device 3203. The transformed data is then passed through the internal bus 3205 to the data transform device 3206 placed on the input-output port side, which performs inverse transformation of the data. After that, the data is transmitted to the outside of the information processing unit through the input-output port. If the data is read out from the register of the coprocessor, the data is first transformed by the data transform device 3204. The transformed data is then passed through the internal bus 3205 to the data transform device 3206 placed on the input-output port side, which performs inverse transformation of the data. After that, the data is transmitted to the outside through the input-output port. If the data is read out from the memory device, the data is first transformed by the data transform device 3207. The transformed data is then passed through the internal bus 3205 to the data transform device 3206 placed on the input-output port side, which performs inverse transformation of the data. After that, the data is output to the outside from the input-output port. Incidentally, data written to/read out from the memory device is treated as an instruction code, or data. There is a case where the above use of the data is definitely determined by an address at which the data is stored; and there is also a case where the data is stored without particularly determining the above use of the data. In addition, when accessing at least the memory device, an address at which the data is stored is specified. As is the case with the data, the data transform device also performs the transformation and the inverse transformation of the address.

As described above, because the data and the address passing through the internal bus 3205 has been transformed by the data transform device, even if an attacker observes the power consumption, it is not possible to acquire information that can be used to carry out an attack. Further, by configuring the data transform device so that it is possible to detect or correct a data error, the security of processing can be ensured even against such an attack that an attacker changes data on purpose.

Incidentally, the reference numerals used in the diagrams of the application concerned will be listed as below.
Vcc Power supply terminal
RST Reset terminal
CLK Clock terminal
GND Ground terminal
I/O Input/output terminal
CPU Central processing unit
COPRO Coprocessor
I/O Input-output port
MEM Memory device
PA Program area
DA Data area
t Time
I Electric current value
START-BUF Start address buffer
PC Program counter buffer
SUB Subtracter
END-BUF End address buffer
DET Determination circuit
R-BUF Random number buffer
RNG Random number generator
ZERO-BUF Zero buffer
Adder Adder
ADDR-BUF Physical address buffer
ADDR (START) Start address
ADDR (USER) User address
ADDR (PHYS) Physical address
R Random number
MAIN Main routine
Y0_TOP Start address of data Y0 (each of Y1_TOP, Y2_TOP, Y3_OP also denotes a start address in a similar manner)
CDB_TOP Start address of CDB
901 CPU
902 Coprocessor
903 Address converter (corresponding to the application concerned shown in FIG. 4)
904 Address bus
905 Data bus
906 Input-output port
907 Memory unit
908 EEPROM
909 Program area of the EEPROM
910 Data area of the EEPROM
911 ROM
912 Program area of the ROM
913 data area of the ROM
914 RAM (because the RAM is a volatile memory, the whole RAM is used as the data area)

915 random number generator
1001 Central processing unit
1002 Coprocessor
1003 Signal line 1
1004 Memory device
1005 Program container part
1006 Data container part
1007 Input-output port
1101 IC card
1102 IC chip
1201, 1202 waveform of power consumption
1301 CPU
1302 Memory device
1303, 1305 Data transform device
1304 Data bus
1401 CPU
1403 Data bus
1404 Data transform device
1405 Memory device
2901, 2909 Key addition device
2902 ECC generator
2903, 2907 Data transform device
2904, 2906 Data bus
2905 Memory device
2908 ECC check device

What is claimed is:

1. An information processing unit that uses two different potentials to express binary information, said information processing unit comprising:
   a memory for storing data;
   an arithmetic unit for performing specified processing according to a program; and
   a transform function for transforming a logical address and a physical address of the memory, said logical address being used for arithmetic operation by the arithmetic unit, said physical address being determined from the logical address and a random number by arithmetic operation,
   wherein
   said physical address of the memory, corresponding to a start address of a logical address used for arithmetic operation by the arithmetic unit, is set at each arithmetic operation, or every time the information processing unit is started up, or before newly performing processing including secret information, or if data in the memory is not used in processing thereafter; and
   said arithmetic unit generates a random number at each arithmetic processing or every time the information processing unit is started up, and adds the random number to the start address of the logical address, and then sets a remainder, obtained by dividing the result of the addition by the use capacity of the memory, as a physical address corresponding to a start address of the logical address.

2. An information processing unit according to claim 1, wherein:
   the use capacity of said memory is exponentiation of 2.

3. An information processing unit according to claim 1, wherein:
   outside an area in which a logical address is transformed, an area is included in which a plurality of pieces of data to be read or written are set so that the hamming distance from the read instruction or the write instruction to the data becomes the same.

4. An information processing unit according to claim 1, wherein:
   said information processing unit is mounted on an IC card.

5. An information processing unit according to claim 1, further comprising:
   a first area in the memory, a physical address of the memory, corresponding to a start address of a logical address used for arithmetic operation by the arithmetic unit, being set in said first area at each arithmetic operation, or every time the information processing unit is started up; and
   a second area provided outside an area in which a logical address is transformed, a plurality of pieces of data to be read or written being set in said second area so that the hamming distance from the read instruction or the write instruction to the data becomes the same.

6. An information processing unit according to claim 5, wherein:
   in the memory, the second area is assigned to a part targeted by an attack that extracts internal information by directly observing an electric current generated in the information processing unit; and
   in the memory, the first area is assigned to an area targeted by an attack that extracts internal information by statistically processing an electric current generated in the information processing unit.

7. An information processing unit comprising:
   an arithmetic unit;
   a memory device for storing data transmitted from the arithmetic unit;
   a data bus, the number of bits of which is (N+r), said data bus connecting the arithmetic unit to the memory device;
   a random number generator; and
   a data transform device,
   wherein:
   using, as a key, data formed of a random number having a length of r bits generated by the random number generator, said data transform device encrypts data having a length of N bits, which has been transmitted from the arithmetic unit, to generate encrypted data having a length of N bits, and then concatenates the encrypted data with the random number to generate data having a length of (N+r) bits before outputting the data having a length of (N+r) bits to the data bus.

8. An information processing unit according to claim 7, wherein:
   said data transform device further performs nonlinear transformation of the data having a length of (N+r) bits, and then output the transformed data to the data bus.

9. An information processing unit according to claim 7, wherein:
   said random number generator generates a random number at each transmission of the data bus.

10. An information processing unit according to claim 9, wherein:
    said random number generator is a pseudo-random number generator.

11. An information processing unit according to claim 7, further comprising:
    a second data transform device,
    wherein:
    said second data transform device determines whether bits transmitted from the arithmetic unit to the memory device through each bus line of the data bus corresponds to the N bits or the r bits, and then extracts the N bits from among the (N+r) bits and discards the r bits.

12. An information processing unit according to claim 11, wherein:
    said data transform device and said second data transform device are transform devices that receive data having a length of (N+r) bits as input and then output an inverse element having a length of N bits in which irreducible polynomials m(x) and m'(x) in GF(2Δ) are values of modulo.

13. An information processing unit according to claim 12, wherein:
said irreducible polynomial used in the data transform device and the second data transform device is configured so that m(x) =m'(x).

14. An information processing unit according to claim 13, further comprising:
a data comparator; and
a second data bus for transmitting r bits to the data comparator, said r bits being obtained from the random number generator, wherein:
said data comparator makes a comparison between the r bits obtained from the second data transform device and the r bits obtained through the second data bus, and if both agree with each other, the r bits are discarded, whereas both do not agree with each other, an error signal is output.

15. An information processing unit according to claim 13, further comprising:
a data comparator; and
a second random number generator,
wherein:
both said random number generator and said second random number generator are pseudo-random number generators, said random number generator having a synchronization signal line connected to the second random number generator, said random number generator being connected to the data transform device, said second random number generator being connected to the data comparator, said comparator making a comparison between the r bits obtained from the second data transform device and the r bit obtained from the second random number generator.

16. An information processing unit according to claim 15, further comprising:
a first output selector for selecting one from among outputs of the plurality of data transform devices; and
a second output selector for selecting one from among outputs of the plurality of second data transform devices, wherein:
said first output selector shares, with the second output selector, data that determines the select operation.

17. An information processing unit according to claim 16, wherein:
said second output selector selects one of outputs of the plurality of second data transform devices, corresponding to inverse transformation of one of the plurality of data transform devices, said one of the plurality of data transform devices being selected by the first output selector.

18. An information processing unit according to claim 11, wherein:
said information processing unit comprises the plurality of data transform devices and the plurality of second data transform devices; and
one of outputs of the plurality of data transform devices is a first output, and the first output is inputted into the plurality of second data transform devices through the data bus, and then from among outputs of the plurality of second data transform devices, outputs excluding the first output are discarded.

19. An information processing unit comprising:
an arithmetic unit;
a memory device for storing data transmitted from the arithmetic unit;
a data bus, the number of bits of which is (N+r), said data bus connecting the arithmetic unit to the memory device;
a random number generator; and
a data transform device,
wherein:
said data transform device concatenates data having a length of N bits transmitted from the arithmetic unit with a random number having a length of r bits generated by the random number generator, and thereby generates data having a length of (N+r) bits, and then performs nonlinear transformation of the data having a length of (N+r) bits before outputting the transformed data to the data bus.

20. An information processing unit according to claim 19, wherein:
said nonlinear transformation is interchange processing that interchanges bit positions of the data having a length of (N+r) bits.

21. An information processing unit according to claim 19, wherein:
said nonlinear transformation is processing that determines an inverse element of the data having a length of (N+r) bits.

22. An information processing unit comprising:
an arithmetic unit;
a memory device for storing data transmitted from the arithmetic unit;
a data bus, the number of bits of which is N, said data bus connecting the arithmetic unit to the memory device;
a random number generator; and
a data transform device,
wherein:
said data transform device receives, as input, data having a length of N bits, and then outputs to the data bus an inverse element having a length of N bits in which irreducible polynomial m(x) in $GF(2^n)$ is a value of modulo.

23. An information processing unit according to claim 22, further comprising:
a second data transform device that is connected to the data bus, wherein:
said data having a length of N bits inputted into the data bus is formed as the concatenation of data having a length of d bits output from the arithmetic unit and data having a length of r bits output from the random number generator; and
said second data transform device outputs the inverse element having a length of N bits, in which the irreducible polynomial is a value of modulo, for data having a length of N bits transmitted from each bus line of the data bus, and then determines whether output bits corresponds to the d bits or the r bits, and thereby extracts the d bits from among (d+r) bits and discards the r bits.

24. An information processing unit according to claim 23, wherein:
said data transform device comprises a transform device for outputting an inverse element in which irreducible polynomial in a plurality of different $GF(2^n)$ is a value of modulo; and
said second data transform device is the same as the data transform device.

25. An information processing unit according to claim 22, wherein:

said information processing unit comprises a plurality of data transform devices; and transmission is performed using any one of a plurality of determination results by the data transform devices.

26. An information processing unit comprising:

an arithmetic unit;

a memory device for storing data transmitted from the arithmetic unit;

a data bus, the number of bits of which is (N+r), said data bus connecting the arithmetic unit to the memory device;

an ECC generator for generating an ECC having a length of r bits from data having a length of N bits received from the arithmetic unit;

a random number generator; and a data transform device, wherein:

by use of a random number generated by the random number generator, said data transform device determines at random a bus line of the data bus, through which the data having a length of N bits received from the arithmetic unit and the ECC having a length of r bits generated by the ECC generator are transmitted to the memory device.

* * * * *